United States Patent
Buckingham et al.

(10) Patent No.: US 6,961,776 B1
(45) Date of Patent: Nov. 1, 2005

(54) ARCHITECTURE FOR MULTIPLE CHANNEL ACCESS TO APPLICATIONS

(75) Inventors: Ronald Brett Buckingham, Kanata (CA); Antoine Barake, Brockville (CA)

(73) Assignee: Nortel Networks Limited, St. Laurent (CA)

( * ) Notice: Subject to any disclaimer, the term of this patent is extended or adjusted under 35 U.S.C. 154(b) by 820 days.

(21) Appl. No.: 09/742,347

(22) Filed: Dec. 22, 2000

(51) Int. Cl.$^7$ ................................................ G06F 15/16
(52) U.S. Cl. ...................... 709/229; 709/229; 709/219; 709/230; 709/246
(58) Field of Search ................................. 709/229, 230, 709/231, 232, 246, 217, 218, 219, 227; 370/466

(56) References Cited

U.S. PATENT DOCUMENTS

| | | | |
|---|---|---|---|
| 6,377,993 B1 * | 4/2002 | Brandt et al. ................ | 709/227 |
| 6,477,565 B1 * | 11/2002 | Daswani et al. ............ | 709/217 |
| 6,501,956 B1 * | 12/2002 | Weeren et al. .............. | 455/463 |
| 6,633,910 B1 * | 10/2003 | Rajan et al. ................ | 709/224 |
| 2001/0032254 A1 * | 10/2001 | Hawkins ..................... | 709/219 |
| 2002/0046084 A1 * | 4/2002 | Steele et al. ................ | 705/14 |

* cited by examiner

*Primary Examiner*—Glenton B. Burgess
*Assistant Examiner*—Yasin Barqadle
(74) *Attorney, Agent, or Firm*—Dennis R. Haszko; Borden Ladner Gervais LLP

(57) ABSTRACT

A system for enabling multiple types of end user devices to access an Internet-based application, the system comprising: an AMI component communicating with the application; a DMI component communicating with the devices; a broker module communicating with the DMI component and with the AMI component, wherein the DMI component converts end data received from the broker module into a format suitable for the devices; the DMI component transmits replies to prompts from the broker module based on an end user's input into the devices; the broker module emulates a sequence of events and decisions followed by the application; the broker module requests application data from the AMI component based on the broker module emulating the application; the AMI component receives requests from the broker module and transmits replies to the requests to the broker module based on original data from the application, the broker module transmits end date to the DMI component, the end data being based on at least one factor chosen from the group comprising: the broker module's emulation of the application; and application data received from the AMI component.

16 Claims, 3 Drawing Sheets

ARCHITECTURE FOR MULTIPLE CHANNEL ACCESS TO APPLICATIONS

FIELD OF THE INVENTION

The present invention relates to computer systems and, more particularly, to methods and systems for the integration of multiple types of devices for accessing Internet based applications.

BACKGROUND TO THE INVENTION

The growth of interest and participation in the Internet has led to a clamor for more ways of accessing Internet based applications. Consumers now use the Internet for tasks which a mere five years ago were considered to be the sole territory of the personal computer. Web based applications now allow people to store, access, modify, and retrieve, among others, their calendars, bank transactions, e-mail, telephone messages, appointments, and contact lists through the Internet. These same consumers now want the ability to access these Internet based applications anywhere using physically smaller devices. Of course, this must be done without compromising the lowest common denominator among most consumers—the personal computer (PC) based Internet browser. Accordingly, any solution must preserve the Internet application's workstation centric core. However, at the same time these applications should also allow such diverse devices as WAP (Wireless Application Protocol) enabled mobile telephones, palmtop computers, regular telephones, and personal digital assistants (PDAs) to access its functions.

To answer the above need, a number of solutions have been attempted with mixed results. Web based applications have been customized to run on these smaller devices with the devices accessing them through specific web portals. Such an approach is, unfortunately, quite expensive. Not only is a rewrite of the application required for each and every device type, there is also no guarantee that the rewritten application will have the functions of the original application.

Another attempted solution is the shrinking of web browsers so that they can run on these devices. Unfortunately, the applications, optimized for PCs, are not suitable for such an approach. The small screen (if any) and the limited capabilities of the devices have led to consumer frustration with this approach. Furthermore, the relatively slow speed of the connection between the device and the portal, normally through a wireless modem, also leads to consumer frustration.

Another drawback to such devices is the lack of scripting capability of the browsers of such devices. A further wrinkle to the problem is the need to customize each attempted solution to a specific device platform. A solution which may work properly with a WAP enabled cellular telephone may not work properly with a PDA and vice versa. Also, what may work with a cellular telephone is almost guaranteed not to work with a regular telephone connected to a PSTN (public switched telephone network).

A suitable solution to the above should be flexible, scalable, and must work equally well with any and all devices which are currently being used to access the Internet. Such a solution should also be transparent to the user and should facilitate rather than hamper a user's access to the Internet application.

SUMMARY OF THE INVENTION

The present invention provides systems and methods which allow an Internet based application to be accessed by any device capable of accessing a specific portal without requiring an intensive rewriting of the application. Indeed, while an API is desirable, no access to the application's source code or application programming interface(API) is required. A three layered system is placed between the application and the accessing device. The first layer is an AMI (Application Mediation Interface) component directly connected with the application. This application component is able to directly access any data stored by the application. A second layer is a broker layer which mimics the general user interface logic of the application. The broker layer emulates the UI (User Interface) workflow of the application and, when required, requests data from the application through the application component. The third layer is a DMI (Device Mediation Interface) component which communicates directly with the end user device. The DMI component receives data from the broker layer and converts this data into user interfaces, data screens, or prompt screens which the end user device can both understand and present to the end user.

In a first aspect the present invention provides a system for enabling multiple types of end user devices to access an application, said system comprising:
- an AMI (Application Mediation Interface) component communicating with said application;
- a DMI (Device Mediation Interface) component communicating with said devices; and
- a broker module communicating with said DMI component and with said AMI component, wherein
- said DMI component converts end data received from said broker module into a format suitable for said devices;
- said DMI component transmits replies to prompts from said broker module based on an end user's input into said devices;
- said broker module emulates a sequence of events and decisions followed by said application;
- said broker module provides application data functions from said AMI component based on said broker module emulating said application;
- said AMI component receives requests from said broker module and transmits replies to said requests to said broker module based on original data from said application; and
- said broker module transmits end data to said DMI component, said end data being based on at least one factor chosen from the group comprising:
  - said broker module's emulation of said application; and
  - application data received from said AMI component.

In a second aspect the present invention provides a method of enabling multiple types of end user devices to access an application, said method comprising:
- emulating a sequence of events and decisions followed by said application at a broker module;
- requesting application data from an AMI (Application Mediation Interface) component based on an emulation of said application by said broker module, said AMI component communicating with said application;
- transmitting application data requested to said broker module from said application server, said application data being based on original data received from said application by said AMI component; and transmitting end data to a DMI (device Mediation Interface) component, said end data being based on at least one factor chosen from the group comprising: said broker module's emulation of said application; application data received from said AMI component; converting said end data at said DMI component into a format suitable for an end user device communicating with said DMI component.

BRIEF DESCRIPTION OF THE DIAGRAMS

A better understanding of the invention may be obtained by reading the detailed description of the invention below, in conjunction with the following drawings, in which.

DETAILED DESCRIPTION OF THE PREFERRED EMBODIMENT

Figure 1:
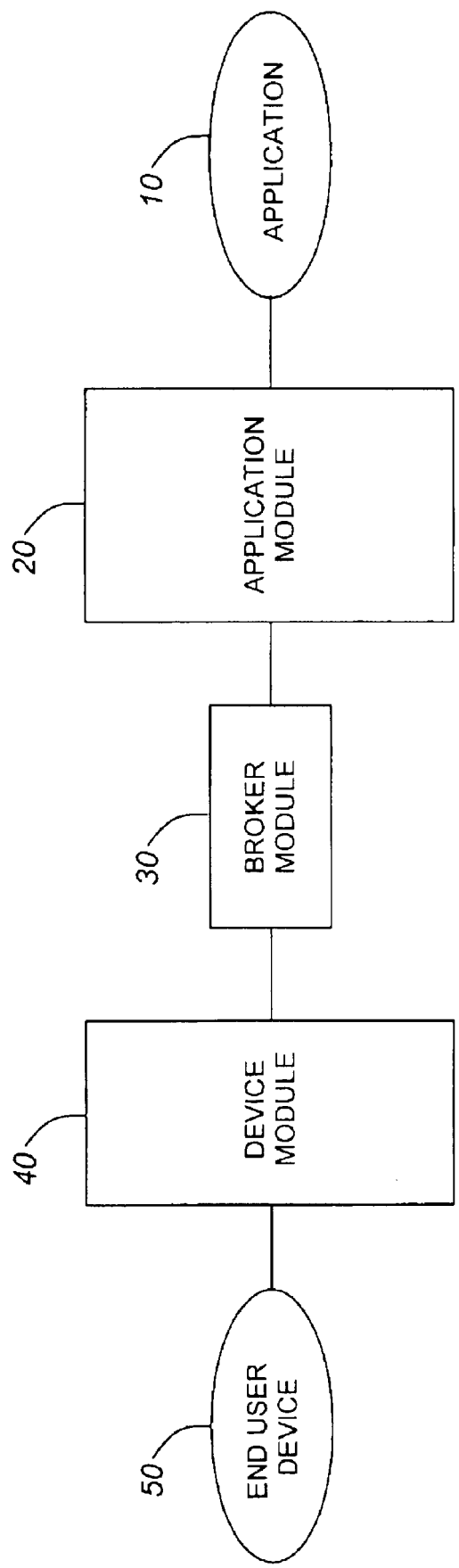
FIG. 1 is a block diagram of a system according to the invention.

Referring to FIG. 1, a block diagram of a system in accordance with the invention is illustrated. An Internet based application 10 communicates with an AMI (Application Mediation Interface) component 20. Coupled to the AMI component is a broker module 30 which, in turn, is coupled to a DMI (Device Mediation Interface) component 40. The DMI component 40 communicates with an end user device 50. The broker module 30 is unique to each application as it reproduces the workflow or the top level logic of the application 10. However, the AMI component 20 abstracts the data of the application 10 so that, when required, the broker module may request application data from the application 10 through the AMI component 20. This application data is then converted and/or added to by the broker module prior to being passed on to the DMI component 40. The DMI component 40 is equipped to receive this end data and convert such data into a format suitable for whichever end user device is connected to it.

Figure 2:
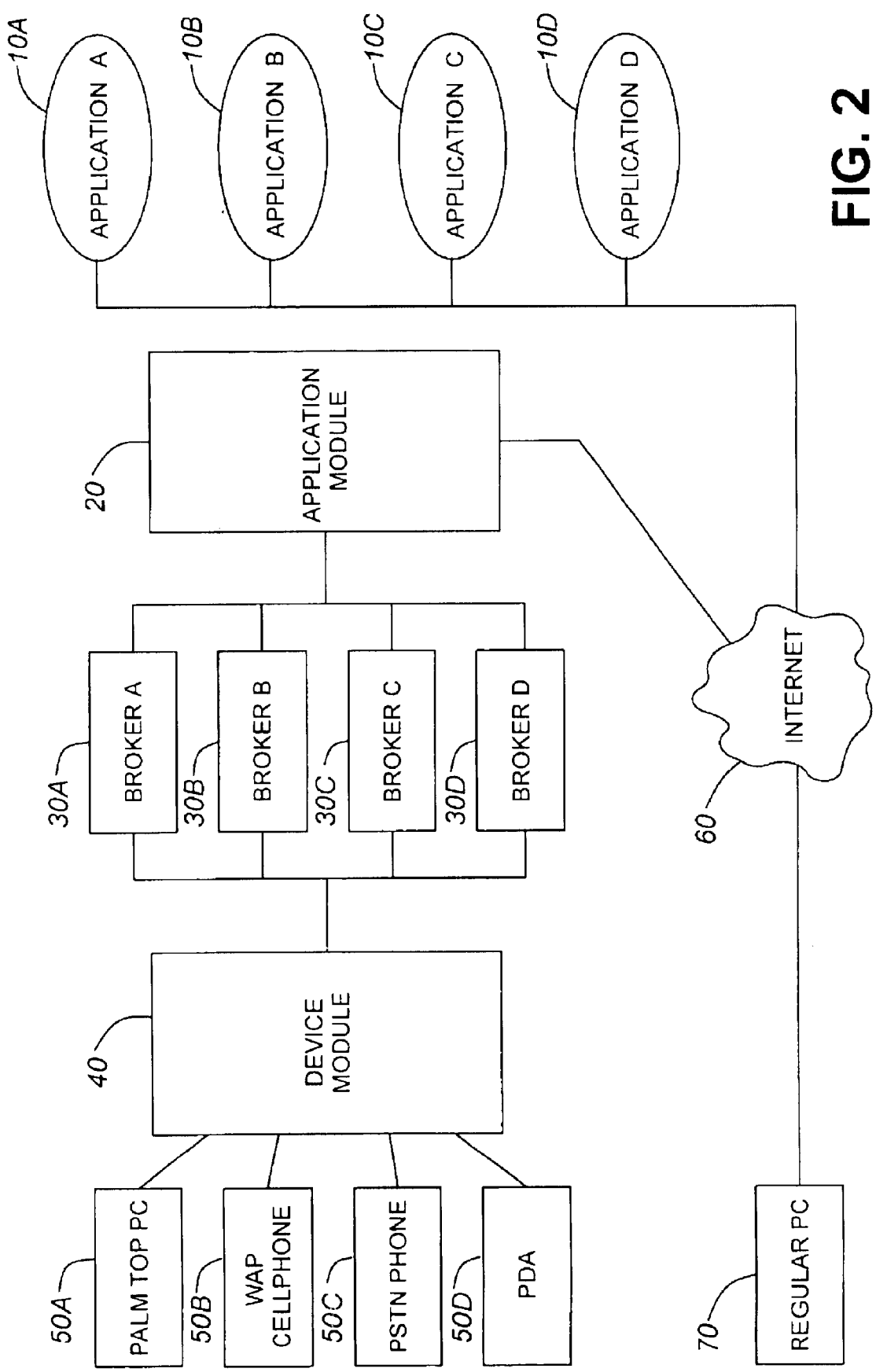
FIG. 2 is a block diagram similar to FIG. 1 but with multiple broker modules and multiple applications.

The above scheme does not compromise the Internet capability of the application 10. As can be seen in FIG. 2, the invention can accommodate multiple applications, multiple end user devices, and still allow regular personal computers access to the applications. From FIG. 2, multiple applications 10A, 10B, 10C, and 10D are communicating with the AMI component 20. For each application, a separate broker module is available. Broker 30A corresponds to application 10A, broker 30B corresponds to application 30B, broker 30C and broker 30D correspond to applications C and D respectively. Also, multiple devices can be connected to the DMI component. Device 50A is a palmtop PC, device 50B is a WAP enabled cellular phone, device 50C is a telephone connected to a PSTN, and device 50D is a PDA. The Internet 60 also connects a regular PC 70 with the applications 10A–10D.

It should be noted that each of the end user devices 50A–50D communicate differently with the DMI component and each one requires a different data format. The palmtop PC can be connected by means of a regular modem while the PDA can be connected by a wireless modem. The WAP cellphone can be connected by its wireless link to the service provider while the telephone 50C is connected by a regular telephone line and a suitable interface.

In a specific implementation, the broker module functions are accomplished by the use of a script written in an XML (extended markup language) derived markup language MCML (multi-channel mark up language). Each script follows and details the workflow of the application for which it is written. When required, the script, through a machine running it, call for data from the AMI component. The script is device independent and AMI component independent. However, as noted above, it details the workflow or top level logic (events and decisions) of the application. Thus, the script will have the user prompts, the choices associated with such prompts, user input fields, data delivery, and the flow decisions associated with such options. The script, will, however, not mimic the deep functions of the application. It is simply a data delivery mechanism—it prompts, receives, and delivers data to the end user through the DMI component. To do this, it requests and receives data from the AMI component. It then reformats and/or adds to the data before sending it on to the DMI component.

The AMI component is a stateless module in that it does not store nor even care about what state or step the application is in. What the AMI component does is to receive the broker module's requests and fulfills those requests by interfacing with the application.

The DMI component is essentially a converter—it receives data from the broker module and converts that data into a format suitable for whatever device is requesting it. Thus, if the end user device is a telephone 50C, then the DMI component converts the data into a Voice XML document and funnels it to a text-to-speech converter so that the data may be read to end user. Conversely, if the device is a WAP enabled cellphone, the data is converted into a WML (WAP markup language) document and transmitted to the end user cellphone. Thus, the data is now in a format which can be read and understood by the end user device. Similarly, if the data sent to the end user requires an input from an end user, the document produced by the end user device is converted to a format suitable for the broker module. Thus, if the device is the PSTN phone 50C in FIG. 2, the end user either speaks the required input or enters it through the keypad. If spoken, the end user's voice is converted, through a voice recognition system in the DMI component, into a Voice XML document. This is then converted into a format recognizable by the broker module.

To manage security and user authentication, an authentication manager is deployed in the system. Such an authentication manager receives the user's credentials such as, name, password and authenticates them. Once authenticated, a session manager, implemented within the broker module, manages that user's transactions. The session manager can serve a twofold duty—not only does it keep track of the user's actions but it would store the state that an application is in. Since the AMI component is stateless and since most applications are state driven, the session manager will store and monitor the application's state. Because of this, it is simpler for the AMI component to retrieve data from the application. As an example, if data A can only be accessed in the application by passing through states A1, A2, and A3, then an AMI component, not having any states, would be hard pressed to find such data. The AMI component may, in a single session, have to always go through those states just to keep accessing the data A. However, if the application is already in state A3 and the session manager has saved this state and has kept the application in this state, then any other time the AMI component requests data A, it would be ready.

To further clarify, the broker module block uses the MCML language in which an MCML flow describes a set of states, to be interpreted by a finite state machine (FSM). These states represent device-independent "forms" which may contain "widgets". The DMI component or Device Adaptor (DA) implicitly implements the FSM and dynamically translates these states to the target devices' mark-up language.

The syntax blocks representing states, stored in one or more MCML documents, are implemented using XML, and can thus be validated. An application workflow consists of one or more linked MCML documents.

There are different types of MCML blocks. These can be:

Text processing block

Menu processing block

GetInput processing block

UserDefined processing block

Blocks can contain tags that may not be used by all devices. It is up to the translating process to select the tags appropriate to the target device. This allows the application flow writer to fine-tune application behaviour to suit devices with special capabilities. For example, some tags control telephony features which are not useful for HTML devices, but which may be useful for a Voice XML device. In that sense, some tags may be redundant in MCML, and would be filtered to produce the device-targeted documents.

MCML documents can be produced or generated using any text editor. It is suggested that a validating editor or parser be used however, to ensure correctness. Alternately, the Saxon XML parser (or any other compliant XML parser) can be used to validate the MCML based on the DTD.

Each application enabled by the multi-channel system requires an MCML flow, which can be implemented as one or more MCML documents. These documents should reside in a dedicated directory to avoid the risk of name clashes with other applications' MCML files. For example, for an expense reporting application, the MCML files may be called:

. . . /ExpenseReporting/main.mcml
   . . . /ExpenseReporting/dataEntry.mcml
   . . . /ExpenseReporting/dataRetrieval.mcml.

The application's flow is abstracted into a series of linked states, represented by MCML blocks within MCML documents. States consist of generic widgets, as detailed below. These are translated into the target device-specific widgets by the device adaptor, once all dynamic content, if any, has been inserted by embedded Java method calls.

Placeholders for EJB (Enterprise Java Beans used to implement a portion of the AMI component or application adaptor) and local class calls can represent dynamic content. Special tags specify the method name and parameters required. The local or remote classes are then called through a filter/macro-processor class that returns an MCML block (a string). This block replaces the place holder tag, and processing continues, with the eventual XSLT translation of the entire MCML document into the target mark-up language page, which is then forwarded to the client.

In one implementation, the following guidelines, standards and subsystems were used:

1. J2EE standard (Sun Microsystems) compliant application server.

2. SAXON 5.4.1 XSLT/XML processor.

3. Web Logic Server 5.1 provides the application server and container framework for all classes. The Commerce Server provides the Web-based Personal Interaction Centre (PIC is MASP's (Managed Application Services Platform) name for a portal) features upon which the multi-channel PIC (not described in this document) is based.

4. Each application's UI flow must be described by a specific set of MCML documents.

5. An XSL style sheet per channel type (VoiceXML, WML, HDML, etc) is required to translate the MCML to the target mark-up language.

6. A Device Adaptor (DA) servlet is used to dynamically generate Voice XML/WML/HTML or other pages using SAXON XSLT to translate the MCML document/script.

7. Error handling is done through Java's remote exception mechanism. AMI Components throw exceptions that are caught and processed by the DA.

Ideally, the following conditions are to be applied in implementing the system:

1. All EJB's and classes that generate dynamic content within the MCML flows must be stateless session beans that are written to conform to the EJB documentation for multi-channel access.

2. Every request from devices must carry a session ID within URL and the current block name.

3. Caching may be done by the DA to avoid latency in reloading and translating MCML.

Default application flow behaviour and default block parameters can be set in a special MCML block.

The following (global) properties can be set:

1. Timeout in seconds for user input response.

2. Number of prompt repetitions before failure.

3. Global URL prefix.

4. Name of starting block.

5. Name of default error processing block.

6. Name of exit/abort block.

7. Session timeout.

EXAMPLE

```
<!-- (default settings) -->
    <globalproperties>
    <property name="timeout" type="int" value="30"/>
    <property name="repeatnum" type="int" value="3" >
    <property name="systemURL" type="text" value="www.nortelnetworks.com"/>
    </globalproperties>
```

MCML states can be categorized into the following types of blocks:

Text display;

Menu options;

Get user input;

User-defined (method call).

A complete MCML application flow must also include other descriptions, such as error handling, version definitions, and embedded comments. These can be categorized as follows:

Global properties;

Error handling block;

Version description;

Copyright description;

Default settings—it includes timeout and other configuration information;

Disconnect block—to handle hang-up events during telephony access.

MCML inherits its syntactic constructs from XML. Reference to XML specification should be made for in-depth information on syntactic issues. The MCML is defined in Backus-Naur Form (BNF which is a generic meta-language used to describe computer language) format as follows:

```
ApplicationFlow :: = <?xml version= "1.0"?>
<mcml>
    <applicationname/>application name
    <copyright>copyright description</copyright>
    <version>version description</version>
    (default settings)
    <globalproperties>(properties) </globalproperties>
    <errorhandle>(processing block
name) </errorhandle>
    <startblock>(processing block name) </startblock>
    <endblock>(processing block name) </endblock>
    (FSMflow)
</mcml>
defaultsettings ::=
<defaultsettings>
    <timeout/> timeout
    . . .
</defaultsettings>
properties ::= <properties>(property) ?</properties>
property ::=
<property>
    <name/>property name
    <type/> (int | long | double | float | string |
date | time)
    <size/> size of the property
    <value/> value of the property
    <default/>default value
</property>
default definitions ::=
    <default>
        (properties)
    </default>
FSMflow ::=
<FSMFlow>
    (processing block)*
</FSMFlow>
Processing block ::=
    TextBlock | MenuBlock | GetInputBlock |
UserDefinedBlock
blockbody ::=
    (Text block | Menu block | GetInput block | List
bLock | UserDefined block)
        MCML text processing blocks allow the
dispLay of text. This content can be either
dynamically generated by an EJB or class, or can be
static. Text blocks can also define buttons, for use
with WAP browsers. These are not used in Voice XML.
        The grammar is as follows:
Text block ::=
<block blocktype="TextBlock" blockname="blockname">
    [ (action) ]
    <properties>(property) ?</properties>
    <prompt>(Message) ?</prompt>
    <buttonsettings>(buttonsetting)*</buttonsettings>
    // for WAP
    (<text>(text content) </text>)*
    <nextblocks>
    (<hitbutton name="buttonname"
goto"=nextblockname"/>)*
    </nextblocks>
</block>
action ::=
    <action>
    <method name="methodname" [type="ejb"]
interface="interfacename" [jndi="jdni-path"]>
        <params>
            (<param name="param-name" type="text"/>)*
        </params>
        <result name="result"/>
    </method>
    </action>
text content :: = [$ (property name) | user-defined
text]
```

MCML menu blocks generate a list of choices on the device. When the user selects one, the FSM will go to the associated next state. Menu choices can cause variables to be set. These variables are typically used to maintain state and are managed by the DA/FSM. These are saved using the state manager to allow multiple simultaneous sessions. The menu items may be static or dynamically generated by embedded method calls.

The XML description of this processing block is as follows:

```
Menu block ::=
<block blocktype="MenuBlock" blockname="blockname">
    <properties>(property) ?</properties>
    // not currently used
    <prompt>(Message) ?</prompt>
    // menu title string
    <menuitems>
    (<menu title="your menu name" id="your menu
id"/>)?      //the items
    </menuitems>
    <choices>
    (<nextblock id="your menu id"
goto="nextblockname" dtmf="digits"/>
    )?        // nextblock definitions must match
menuitems
    </choices>
</block>
```

The MCML GetInput processing block is used to collect the input data from a user. It posts an input form page on the device's browser first and then waits for the input.

The syntax description is as follows:

```
GetInput block ::=
<block blocktype="Get InputBlock"
blockname="blockname">
    <properties>
    (property)?
    </properties>
    <prompt>(Message) ?</prompt>
    <buttonsettings>(buttonsetting)*</buttonsettings>
    // for WAP
    <form title="form title">
        (formitem)?
    </form>
    <nextblocks>
    <filled>block name</filled>
    <timeout>hangup block</timeout>
    <defaultblock>block name</defaultblock> //
handle default case
    </nextblocks>
formitem ::=
    <input name="fieldname"
                type=(password | text | numeric)
            size=the length of the field
                title="fieldname">
            default= the default value for this field
    </input>
```

The UserDefined MCML processing block is a data processing block. It does not post any page to the browser at all. It serves to make method calls to the application adaptor EJB methods, or optionally to local classes. The resulting output is saved in FSM variables and can be used in subsequent processing blocks. The syntax description is as follows:

```
UserDefinedblock ::=
<block blocktype="UserDefinedBlock"
blockname="blockname">
    <properties>
    (property)?
    </properties>
    [action]
    <nextblocks>
    <failure>block name</failure>
    <success>block name</success>
    <defaultblock>block name</defaultblock>   //
handle default case
    </nextblocks>
</block>
```

Integration Details

For each application, an MCML flow must be written to describe the application workflow. The associated EJB's and called classes must also be written, and the linkage between the MCML variable name, state names, and class names must be done so that thesecan work in concert. This means that the EJB's and MCML must be written with a knowledge of each other.

To test, the EJB's must be deployed on the application server, the MCML files stored under the public_html directory hierarchy, and the DA invoked using a client.

The appropriate XSL style sheet can be passed as a request parameter to the DA, and the resulting target specific mark-up should be returned.

Return Codes and Error Handling

EJB's or other called classes return errors using one of two mechanisms:

1. Throwing a remote exception, to be caught by the DA.
2. Returning a null string instead of dynamically generated MCML.

Both are handled in the same way:
The DA will detect the error;
  if the method called was not part of an EJB, or if it was not an authentication exception, or if the retries above failed, then the DA will go to the failure branch in the UserDefined block that called the method. This should point to a block that handles the error, either by notifying the user, or attempting retries;
  the DA reserves a special variable called_error Message that is guaranteed to always contain the string returned by the last exception caught.

Example Usage

Two examples of MCML code follow:

```
<?xml version= "1.0"?>
<!-- filename: calendar.mcml ->
<!-- Date: Aug. 22, 2000 -->
<!-- The following MCML document describes a Calendar
application workflow.
        note: It assumes authentication is passed.
        The description of workflow is as follows:
        1. Calendar application welcome page (Text)
            C: Welcome to the Calendar application.
            goto 2 ask for date
        2. Ask for the appointment date (GetInput)
            C: Please say the appointment date.
            goto 3 get summaries
        3. Get the summaries of the specified date (UserDefined)
            Call EJB to get summaries for the specified day
            save summaries in somewhere else.
            got 4 play summaries.
        4. Say the summaries (Menu)
            repeat              goto 4
            detail              goto 5 ask for the
                                specified time
            other day       goto 2 ask for date
        5. Ask for time (GetInput)
            goto 6 to get the detail
        6. Get the detail (UserDefined)
            Call EJBs to get the detail and save it somewhere else.
            goto 7 to play the detail.
        7. Play the detail (Menu)
            repeat              goto 7
            other appointment   goto 5 ask for time
            other day           goto 2 ask for date
-->
<mcml>
    <applicationname>Calendar</applicationname>
    <copyright>Nortel Networks Copyright. July, 2000</copyright>
    <version>MCML Version 1.0</version>
    <!--(default.settings)-->
    <globalproperties>
            <property name="timeout" type="int" value="30"/>
            <property name="repeatnum" type="int" value="3">
            <property name="systemURL" type="text" value="www.nortelnetworks.com"/>
            <property name="userid" type="text"/>
            <property name="password" type="password"/>
    </globalproperties>
    <errorhandle>
            <hangup blockname="hangupblock"/>
            <error blockname="errorblock"/>
    </errorhandle>
    <FSMFlow>
        <block blocktype="TextBlock" blockname="start">
            <!-- ask for date -->
            <text> Welcome to the Calendar application.
</text>
            <nextblocks defaultblock="askfordate">
                <timeout goto="disconnect"/>
            </nextblocks>
        </block>
        <block blocktype="GetInputBlock" blockname="askfordate">
            <!-- ask for date -->
            <prompt>
                    <message msgmode="Voice XML" msgtype="text" content="Please say the appointment date."/>
            </prompt>
            <form>
                    <input name="date" type="date" title="date"/>
            </form>
            <nextblocks defaultblock="get summaries">
                <!-- demo .. goto hangup -->
                <filled goto="getsummaries">
                    <output name="date" type="date"/>
                </filled>
            </nextblocks>
        </block>
        <!-- need a specific implementation using servlet or java class -->
        <block blocktype="UserDefinedBlock" blockname="getsummaries">
            <properties/>
            <action>
                    <!--method name="getSummaries" interface="com.nortel.masp.mca.MCML.CalendarWrapper" source="http://localhost:7001"-->
                    <!--method name="makeEJBcall" interface="com.nortel.masp.mca.MCML.CalendarWrapper" source="http://localhost:7001"-->
                    <!--method name="getSummaries"
```

```
type="ejb"
interface="com.nortel.masp.mca.MyCalendarRemote"
ejbhome="com.nortel.masp.mca.MyCalendarHome"
jndi="mca.MyCalendarHome"
ejbhost="t3://localhost:7001"-->
                <method name="getSummaries" type=
"ejb"interface="com.nortel.masp.mca.MyCalendarRemote"
jndi="mca.MyCalendarHome">
                        <params>
                                <!--param
name="remote=com.nortel.masp.mca.CalendarRemote"
type="text"/-->
                                <!--param
name="jndi=mca.CalendarHome" type="text"/ -->
                                <param
name="CalendarURL=http://wleey006.ca.nortel.com"type= "text"/>
                                <param name="port=81" type=
"text"/>
                                <param name="username=
demo" type="text"/>
                                <param name="password=
new2day" type="text"/>
                                <param name="date" type=
"text"/>
                        </params>
                        <result name="summariesmenu"/>
                    </method>
                </action>
                <nextblocks>
                    <success goto="saysummaries"/>
                    <failure goto="noappointment"/>
                </nextblocks>
            </block>
            <block blocktype="MenuBlock" blockname=
"saysummaries">
                        {$summariesmenu}
            </block>
            <block blocktype="TextBlock" blockname=
"noappointment">
                <properties/>
                <prompt/>
                <buttonsettings>
                    <button buttontype="accept" label=
"back"/>
                    <button>
                </buttonsettings>
                <text>No appointment for this day</text>
                <nextblocks defaultblock="askfordate">
                    <hitbutton name="back"
goto="askfordate"/>
                </nextblocks>
            </block>
            <!-- it needs a specific servlet or class to implement
this block -->
            <block blocktype="UserDefinedBlock"
blockname="getdetail">
                <properties/>
                <action>
                    <method name="getDetail" type="ejb"
interface="com.nortel.masp.mca.MyCalendarRemote"
jndi="mca.MyCalendarHome">
                        <params>
                            <param name="UID" type=
"text"/>
                            <param name="port=81" type=
"text"/>
                            <param name="username=
demo" type="text"/>
                            <param name="password=
new2day" type="text"/>
                        </params>
                        <result name="detail"/>
                    </method>
                </action>
                <output><property name="detail"
type="text"/></output>
                <nextblocks>
                    <success goto="saydetail"/>
                    <failure goto="saynoappointment"/>
                </nextblocks>
            </block>
            <block blocktype="MenuBlock" blockname="saydetail">
                <properties/>
                <prompt>
                    <message msgtype="text" content="your
appointment is as follows: "/>
                    <message msgtype="text" content="{$detail}"/>
                    <message msgmode="Voice XML"
msgtype="text" content=" Please choose one of the following options:
summary, another day, or repeat."/>
                </prompt>
                <menuitems>
                    <menu title="repeat" id="repeat"/>
                    <menu title="back to summary" id="summary" />
                    <menu title="another day" id="another day"/>
                </menuitems>
                <choices defaultblock="askfortime">
                    <nextblock id="repeat" goto="saydetail"/>
                    <nextblock id="summary" goto=
"saysummaries"/>
                    <nextblock id="another day" goto=
"askfordate"/>
                </choices>
            </block>
            <block blocktype="TextBlock"
blockname="saynoappointment">
                <!-- ask for date -->
                <action>
                    <method name="toSpeakableDate"
interface="com.nortel.masp.mca.MCML.MCMLutils">
                        <params>
                            <param name="date" type="text"/>
                        </params>
                        <result name="speakableDate"/>
                    </method>
                </action>
                <prompt>
                    <message msgtype="text" content="No
appointment on {$speakableDate}"/>
                </prompt>
                <nextblocks defaultblock="askfortime">
                    <timeout goto="hangup"/>
                </nextblocks>
            </block>
            <block blocktype="TextBlock"
blockname="hangup">
                <buttonsettings>
                    <button buttontype="accept"
label="OK"/>
                    <button/>
                </buttonsettings>
                <text>Thank you for calling calendar
application. Goodbye.</text>
                <nextblocks defaultblock="disconnect">
                    <hitbutton name="OK"
goto="askfordate"/>
                </nextblocks>
            </block>
            <block blocktype="DisconnectBlock"
blockname="disconnect">
                <disconnect/>
            </block>
        </FSMFlow>
</mcml>
<?xml version= "1.0"?>
<!-- filename: IMAP4.mcml -->
<!-- Author: T.Barake -->
<!-- Date: Sept. 12, 2000 -->
<!-- The following MCML document describes a Messenger
application workflow.
        note: It assumes authentication has occurred and stored in
session manager
Workflow states:
        MAIN
            Email main menu
                1- Get list of unread mail headers - goto UNREAD
                2- Choose a mailbox - goto SETBOX
                3- Contact list - goto CONTACTS
```

```
            EXITtoIMAP
        UNREAD
                Menu of unread headers if any
                otherwise
                Display a message saying no unread messages
                uses:
                SELECT              MAIN
        SELECT
                Display the detail
                uses:
                UNREAD              MAIN
        SETBOX
                Menu of available mailboxes is displayed
                SELECTBOX           MAIN
        SELECTBOX
                Menu of unread headers if any
                otherwise
                Display a message saying no messages
                uses:
                DETAIL              MAIN
        DETAIL
                Display the detail
                uses:
                SELECTBOX           MAIN
        CONTACTS
                Menu of contact headers if any
                otherwise
                Display a message saying no contacts
                uses:
                SELECTCONTACT       MAIN
        SELECTCONTACT
                Display the detail on a contact
                uses:
                CONTACTS            MAIN
-->
<mcml>
    <applicationname>Calendar</applicationname>
    <copyright>Nortel Networks Copyright.
October, 2000</copyright>
    <author>A. Barake</author>
    <version>MCML Version 1.0</version>
    <!--(default settings)-->
    <globalproperties>
        <property name="timeout" type="int" value="30"/>
        <property name="repeatnum" type="int" value="3"/>
        <property name="systemURL" type="text" value=
"www.nortelnetworks.com"/>
        <property name="userid" type="text"/>
        <property name="password" type="password"/>
    </globalproperties>
    <errorhandle>
        <hangup blockname="hangupblock"/>
        <error blockname="errorblock"/>
    </errorhandle>
    <FSMFlow>
        <block blocktype="MenuBlock" blockname="start">
            <properties/>
            <prompt>
            <message msgtype="text" content="Messenger eMail"/>
            </prompt>
            <menuitems>
            <menu title="1. Get unread mail headers" id="1" />
            <menu title="2. Choose a mailbox" id="2"/>
            <menu title="3. Contact list" id="3" />
            </menuitems>
            <choices defaultblock="get" dtmf="true">
                    <nextblock id="1"
go to="FETCHUNREADHEADERS"/>
                    <nextblock id="2" goto="SETBOX"/>
                    <nextblock id="3" goto="CONTACTS"/>
            </choices>
            <!-- button required EXITtoIMAP -->
        </block>
        <block blocktype="UserDefinedBlock"
            blockname="FETCHUNREADHEADERS">
            <properties/>
            <action>
                <method name="getUnreadMessageHeaders" type=
"ejb"
interface="com.nortel.masp.mca.Imap4Remote"
jndi="mca.Imap4Home">
                    <params>
                            <param name="mailbox=inbox"
type="text"/>  <!-- (java.lang.String mailbox) -->
                    <params>
                            <result name="unreadheadersmenu"/>
                </method>
            </action>
            <nextblocks>
                <success goto="DISPUNREADHEADERS"/>
                <failure goto="NOMESSAGES"/>
            </nextblocks>
        </block>
        <block blocktype="MenuBlock"
                blockname="DISPUNREADHEADERS">
                    {$unreadheadersmenu}
            <nextblocks defaultblock="MAIN">
                    <hitbutton name="OK" goto="DISPDETAILS"/>
                    <hitbutton name="back" goto="MAIN"/>
            </nextblocks>
        </block>
        <block blocktype="TextBlock"
            blockname="NOMESSAGES">
            <properties/>
            <prompt/>
            <buttonsettings>
                <button buttontype="accept" label="back"/>
                        <button/>
            </buttonsettings>
            <text>No unread messages found</text>
            <nextblocks defaultblock="MAIN">
                        <hitbutton name="back" goto="MAIN" />
            </nextblocks>
        </block>
        <block blocktype="UserDefinedBlock"
            blockname="SETBOX">
            <properties/>
            <action>
                <method name="getFolderNames" type="ejb"
interface="com.nortel.masp.mca.Imap4Remote"
jndi="mca.Imap4Home">
                            <result name="foldernamesmenu"/>
                </method>
            </action>
            <nextblocks>
                    <success goto="DISPFOLDERS"/>
                    <failure goto="NOFOLDERS"/>
            </nextblocks>
        </block>
        <block blocktype="MenuBlock"
                blockname="DISPFOLDERS">
                    <!-- selecting a folder here
sends you to the header list fetch for that folder -->
                            <!-- must return variable called
foldername with correct folder in it -->
                    {$foldernamesmenu}
            <nextblocks defaultblock="MAIN">
                    <hitbutton name="OK" goto=
"FETCHHEADERS"/>
                    <hitbutton name="back" goto="MAIN"/>
            </nextblocks>
        </block>
        <block blocktype="UserDefinedBlock"
            blockname="FETCHHEADERS">
            <properties/>
            <action>
                <method name="getAllMessageHeaders" type=
"ejb"
interface="com.nortel.masp.mca.Imap4Remote"
jndi="mca.Imap4Home">
                    <params>
                            <param name="{$mailbox}"
type="text"/>  <!-- (java.lang.String mailbox) -->
                    </params>
                            <result name="allheadersmenu"/>
                </method>
            </action>
            <nextblocks>
```

-continued

```
            <success goto="DISPHEADERS"/>
            <failure goto="NOMESSAGES"/>
        </nextblocks>
    </block>
    <block blocktype="MenuBlock"
            blockname="DISPHEADERS">
                        <!-- selecting a folder here
sends you to the header list fetch for that folder -->
                        <!-- must return variable called
foldername with correct folder in it -->
            {$allheadersmenu}
            <nextblocks defaultblock-"MAIN">
                <hitbutton name="OK" goto=
"DISPDETAILS"/>
                <hitbutton name="back" goto="MAIN"/>
            </nextblocks>
    </block>
    <block blocktype="UserDefinedBlock"
            blockname="DISPDETAILS">
        <properties>
        <action>
            <method name="getSelectedMessage" type="ejb"
interface="com.nortel.masp.mca.Imap4Remote"
jndi="mca.Imap4Home">
                <params>
                        <param name="{$mailbox}"
type="text"/>   <!-- (java.lang.String mailbox, int mail_Id)-->
                        <param name=" {$mail_Id}" type=
"int"/>
                </params>
                <result name="messagedetails"/>
            </method>
        </action>
        <nextblocks>
            <success goto="SHOWDETAILS"/>
            <failure goto="NOMESSAGES"/>
        </nextblocks>
    </block>
    <block blocktype="TextBlock"
            blockname="SHOWDETAILS">
                {$messagedetails}
            <nextblocks defaultblock="MAIN">
                <hitbutton name="OK" goto="MAIN"/>
            </nextblocks>
    </block>
        <block blocktype="TextBlock" blockname="done">
            <buttonsettings>
                <button buttontype="accept" label="OK"/>
                <button/>
            </buttonsettings>
            <text>Thank you for calling the Messenger application.
Goodbye.</text>
            <nextblocks defaultblock="disconnect">
                <hitbutton name="OK"
goto="askfordate"/>
            </nextblocks>
        </block>
        <block blocktype="DisconnectBlock"
blockname="disconnect">
            <disconnect/>
        </block>
    </FSMFlow>
</mcml>
```

Regarding the authentication manager, the authentication subsystem consists of the front-line authentication servlet, an LDAP directory shared with MASP, and application-specific authentication methods, implemented as part of the application adaptors' EJB. As noted above, the term application adaptor is interchangeably used to refer to the AMI component.

The role of the authentication servlet is to assign a session to the new user, and to maintain and manage this session for authenticated users in conjuction with the Device Adaptor (DA). It assigns a temporary session key during login and a session key after validation, and dispatches the request to the DA. The dispatched request is modified to suit the client brower's protocol and mark-up language, so that the DA can reply appropriately.

A valid login will result in a session key being assigned and the storing of the user's login and password information in the session manager, for access by the application adaptors.

The authentication servlet is responsible for timing out an inactive session as well as logging all login attempts made to it.

The authentication servlet uses an SQL table to store and maintain an authenticated user session, and all information that is necessary to continuing that session. Session information specific to the display of pages, or the flow of control are stored in the Multi-Channel session manager in the DA.

Since application adaptor EJB's are designed to be stateless, they store all session state variables in the session manager. In the case of the authentication method within an EJB, its role is to create and store a client object to be used by the application access methods.

The role of the authentication method associated with the application adaptor EJB's is to create a session between the application adaptor and the back-end application, using the login credentials supplied to the DA and stored in the session manager by the authentication servlet. All application adaptor EJB methods assume that a valid client connection exists in the session. If this assumption is not true, the session manager throws an exception, which is caught by the DA. The DA will then call the EJB's authentication method to create the missing client connection, and will retry the call. This is possible since EJB's are stateless.

By using this approach, EJB methods can be coded in a straightforward manner, and authentication is handled transparently to most of the code. There must, however, be a login method associate ith each EJB, responsible to do the login negotiation in response to the authentication exception. Such methods are potentially re-usable by multiple EJB's that access similar back-end protocols (for example IMAP4).

The following example only covers authentication examples for the following protocols: HTTP, IMAP, LDAP. Further authentication code will have to be written along the same lines to enable single sign-on capability in applications that use protocols other than these.

The system is accessed through a single URL, which points to the authentication servlet. This servlet is responsible for dispatching the request in a manner appropriate for the requesting client browser (ex: WML, HTML, HDML, Voice XML).

Ideally, the system would use the following requirements:
Each application adaptor EJB requires a special authentication method called "login";
Application adaptor EJB methods must assume that the client connection to the application is stored in the session manager using a special name; and
The special name for the authentication exception substring must be defined in the "util.constants" object.

Normal communications between the application adaptor EJBs and their applications need an authenticated session. Whether or not this session has been initiated will be checked transparently (as the EJB tries to read the application client from the Session Manager). If the client session cannot be found in the session manager, an exception will be thrown, which will prompt the device adaptor to call the special login EJB method to set up this session.

The following design guidelines and tools may be used:
1. Java (Sun's JDK 1.2.2) is used for authentication EJB coding.
2. The J2EE 2.0 specification for EJB interface and deployment is adhered to.

3. The application adaptor EJB's are stateless, in that any device-side method call can be made at any time. State is maintained outside the EJB's, in the unique Session Manager. Therefore EJB's can be replicated and clustered.
4. Getting an authenticated session open to an application must be transparent and be able to re-login to the application if the previous application session has timed out.
5. We want to keep the authentication mechanism in the application adaptor EJB as simple as possible.
6. Authentication credentials and session dispatching occurs transparently to the DA and application adaptors, and is handled by the exposed authentication servlet.

Ideally, the following conditions will also apply:
1. All EJB's must use the session manager to store state or instance information. No instance variables are allowed. The EJB's should be clusterable across different servers and operate with a single logical session manager.
2. Since the client objects stored in the Session Manager may contain socket handles or files handles (and those handles are not transferable between machines), the device adaptor must always make calls to EJBs on one server only.

Each application adaptor EJB will have a standard method call named "login" which will be used by the device adaptor to set up an authenticated session with the application. This method will take the standard parameters for all application adaptor EJBs: A session manager, and a property list which potentially contains additional parameters (if required).

That session will be read back from the session manager by each EJB method and used to communicate with the application. If the session is created successfully by the login method, it stores it in the session manager using a key name with the following format:
<application name><loginClientSubstring>
The "loginClientSubstring" is retrieved from the util.constants class.

This allows the other EJB methods to retrieve the client connection with the application using a standardized name, and also allows the DA to identify the exception that may be thrown if this key does not exist (no login has yet occurred). The DA does this by parsing for the substring on all received exceptions, and it treats this particular exception as a special case.

The following is a description of the steps taken by the authentication servlet when handling a request:
If incoming http request contains a system authentication key, check the key (see method below).
If valid, pass the request on to the DA.
  If there is no key associated with the request, or if the key is invalid (it may have expired or may be an attack), challenge the user agent (client browser) as follows:
    Save the incoming URL based on the generated key;
    Generate a temporary key for this reply and forward with device-specific form to the user;
    Call the dispatch method (see key generation description below), to generate a device-specific login form by sending a request to the DA to translate login.mcml;
    The dispatch method determines the type of client (WML, Voice XML, HDML, or HTML). The default type is HTML (settable);
    Record the WebLogicSession key returned from the DA;
    Wait for reply. When received, check the validity of the temp key (see algorithm below);
    Convert user id and password from numeric if required (for Voice XML)
    Lookup the user id/password in the LDAP
    If authentication succeeds, proceed below, otherwise, retry above
    Restore the original URL
    Delete temporary login key
    Create a authentication session key (see key generation description below) and append to request
    Replace authentication key with WebLogicSession key returned from the login step
    Add the userid and password to the request sent to the DA
    Forward the request to the DA Two types of keys are possible—temporary and session key with the same contents otherwise. The steps in the key generation process may be as follows:
  Encode an expiry date (set to 1 hour for session keys, shorter for temp keys, but configurable)
  Encode a random number
  Encode sender's IP (IPV4 or IPV6)
  RSA sign a buffer containing the above 4 items.
  Add the signature to the end of the key buffer
  Base 64 encode the buffer.

To validate the key, the process may take the following steps:
  decode the key using Base 64 decoding
  Split the result into key and signature
  Verify the key using the RSA signature.
  Check key's age—if near expiry (within 10 minutes) and it is a session key, reset the expiry to another hour since this request counts as activity
  Check that the sender's IP still matches that of the sender when the key was created.
  Base further processing on the key type.

EJB login methods are required to connect to the back-end applications. The following is a template for such methods.

```
EJB_wrapper ( . . . ) {
    try {
        AppEJB.method( SessMgr, parameter1,
    parameter2 . . .);
    }
    catch InvalidXXX {
        AppEJB.login( SessMgr );
    }
}
AppEJB {
    public method1( SessMgr, . . . ) {
        client = SessMgr.getCurrentState( ).get(
    "AppCLIENT" );
        . . .
    }
    public method2( SessMgr, . . . ) {
        client = SessMgr.getCurrentState ( ).get(
    "AppCLIENT" );
        . . .
    }
    public login( SessMgr ) {
        AuthEJB.login( SessMgr, "AppCLIENT" );
    }
}
AuthEJB {
    public login( SessMgr, String app ) {
```

-continued

```
        // Get userid/password
        String userid =
    sessMgr.getCurrentState( ).get("userid");
        String passwd =
    sessMgr.getCurrentState( ).get("password");
        // Connect to LDAP DB with userid/password (if
    necessary)
        // Lookup login credentials for user to login to
    app
        // Login to app
        ClientClass   client = new ClientClass(userid,
    password);
        // Store client in sessMgr
            SessMgr.getCurrentState( ).put( app, client
    );
        }
    }
```

Concerning the session manager, the multi-channel architecture requires a session manager to maintain user and application session state and to provide dynamic state storage and retrieval services to the application adaptors. Since the application adaptors may be distributed over several servers, this service must be unique or replica-aware, and must serve all adaptors from the same central session repository. It may of course be implemented as distributed objects drawing from the same database. The actual mechanism and location of the session repository is transparent to application programmers (device adaptors and EJBs.) The session manager object is passed by reference to all adaptors and EJBs. The session manager implicitly maintains a session ID. The session ID is embedded in the URL of all transactions with the client, since cookie support cannot be assumed.

The session manager provides the following advantages:
1. Provides user authentication into the application. The application adaptors can use the session manager to access applications.
2. Dynamic session instance management that includes application specific instance fields (containers), for example "session-id" or "phoneNumber". The session manager is used to store such dynamic session state information on behalf of the application and device adaptors.
3. User profile management. The multi-channel session manager maintains the end-user specific configuration (profile) which includes a list of provisioned applications with associated devices supported (properties). Profiles are created and populated via the Management Interaction Center (MIC) and Business Interaction Center (BIC) interface in the completed system. MIC is a portal for the hosted application provider (HSP) to provision businesses to use MASP applications. BIC is the hosted business portal, used to manage their employees' access to hosted applications. The information is stored using Web Logic's Personalization Server facilities, but would be manually populated for the interim release checkpoints, and for testing purposes. Web-based provisioning is assumed to be as provided by MASP 1.1. Examples of configuration fields on a per-user basis would consist of:
a) Predefined (by user) e-mail responses
b) Predefined (by user) appointment summaries and locations
c) List of enabled applications, and URI's on a per-channel basis
d) APM related configuration information
e) PIC preferences
f) Application specific generic workflows (MCML) for multi-channel enabled applications, and for the PIC.
g) Application specific time-out overrides.
h) Sign-on enabling information (APM codes).
i) User preferences (for the PIC) such as application menu order,
internationalization settings, ASR/TTS engine preferences.

The session manager may require the following:
1. Location and linkage information for Personalization Server (or other) database.
2. APM related interface information (server URI).
3. Resource file locations
4. Session ID base
5. Log file URI
6. Default system time-out values The following functions are available to the users of the session manager:
1. Session creation, which returns a unique session state object.
2. Session retrieval via session manager.
3. Put data into session—add an item to the session's property list, name-value pair, where value is an object.
4. Get data from a session—name-value pair property list.
5. Delete a value from a session.
6. Save a session state once the state has reached a new, consistent stage.
7. Destroy the current session, i.e., logout.

Internal methods:
1. Update of profile information—retrieval from personalization server.
2. Log-in to a given application (may use APM).
3. Log-out from a given application.
4. Get a new unique session id.

The session manager has to implement the functionality described above by providing the following services:
1. Create a unique user session upon single sign-on from PIC.
2. Creation of a session, and retrieval of user profile data from personalization server database based on user credentials.
3. Association with a session-id, suited for passing, as post data over http to the devices and adaptors (must fit within thin client browser data size constraints).
4. Read-write access to session information via session id. This includes user profile, and dynamic session data.
5. Destruction of user session, through API call, or as a result of inactivity timeout.

The session manager also manages the following data:
1. Persistent user profile information: provisioned applications and associated devices supported, application specific generic workflows (MCML), sign-on enabling information (APM codes), PIC related preferences.
2. Non-persistent application session state and instance information. This data is application dependent and non-static. The EJB's that make up the application adaptors can use the session manager to store state and session information as required. This data is subject to inactivity timeout constraints.

The following design guidelines can apply:
1. The session manager is necessarily a high-demand service, and requires an efficient implementation, which would include caching, passivation and clustering support.

2. Java (Sun's JDK 1.2.2) is used for device and application adaptor coding.
3. WebLogic Server 5.1 provides the application server and container framework for these classes. Weblogic Server's in-memory replication of HttpSession will be used to increase the throughput of session management. JDBC-based session management can also be considered in the future. The actual choice (in-memory replication vs JDBC) is transparent to the application layer (device adaptors and EJBs.) The Personalization Server (v 2.0) provides the Web-based PIC features upon which the multi-channel PIC (not described in this document) is based.

The session manager is ideally able to handle a large number of sessions concurrently, and must therefore use an efficient mechanism for data storage and retrieval. The limitations on performance are to be load tested and must concord with MASP specifications for number of concurrent multi-channel users.

The DMI component or device adaptor (DA) can be implemented using the example provided below.

It should be noted that the example provided uses a PSTN telephone as the end user device.

It should also be noted that the ASR/TTS (text-to-speech) channel functionality is dependent on the VoiceXML implementation.

Furthermore, since the voice channel has inherent limitations from a user-interface point of view, i.e.:
a) one-at-a-time menu selection capability,
b) limited data entry capability,
c) limited (to approximately 100 words) vocabulary for acceptable speaker-independent recognition.

The user interface for this implementation has some inherent problems. The user interacts with the system using DTMF tones and speech. Typically, the system prompts the user with generated and pre-recorded text and sounds, and the user can respond with DTMF keystrokes or with spoken commands. The interface is analogous interactive voice response (IVR) call flows, but the menus may be made "flatter" to take advantage of the larger response range of ASR as opposed to DTMF.

Some responses and prompts are standard for all applications, akin to the "*", "0" or "#" DTMF request in an IVR system:
General guidelines:
a. The user can say, "help" or "I don't understand", or "repeat" to obtain more information or an alternate prompt.
b. Numeric responses can be entered via DTMF or ASR. Yes and No responses can be entered via DTMF as 1 or 2 respectively.
c. The user can say "hang-up" to exit the application at any time.
d. Passwords and PIN's should only be entered via DTMF to avoid being overheard or misinterpreted.

System requests:
a) The system prompts the user with sounds, pre-recorded text, or TTS generated text, as indicated in the MCML flow.
b) Failure to respond within a timeout setting in the session manager will result in the prompt be rephrased, and if no response is received after a longer timeout, the application will disconnect.

The multi-channel session manager maintains the end-user specific configuration. This configuration information is used by the device adaptor to determine which applications are enabled for a particular user and channel.

Access to this information is through the session manager interface described elsewhere.

A single device adaptor is required for the ASR/TTS channel. Its role is to translate the MCML application flow into a state machine instance to drive the client.

The device adaptor is called from the PIC application when the user selects an application from the main menu.

The DMI component executes the following steps when accessing an application:
a) Start a selected application session, given the application name, and the APM key obtained from the PIC's login. The following steps are then taken:

Logs-in to the selected application

If successful, this effectively starts a session for the user by calling the session manager to set-up an instance for the application session Obtain the application's EJB coordinates for the application from the session manager Obtains the MCML document from the session manager.

Translates the first state to a device specific template using the XSLT service and the device-specific style sheet.

Translate placeholders for dynamic content by making EJB calls.

Drive the application interaction including state transitions using EJB calls until the user exits the flow or a timeout occurs Returns a status code to the calling application (PIC).

a) Force an instance of a session to exit, based on its session ID. Clean up any instance data in the session manager.

The design of the ASR/TTS component of the multi-channel subsystem involves two major sub-components:
a) The application adaptor, which consists of a set of Stateless Session Beans that communicate with the applications. The adaptor also consists of a MCML (XML multi-channel application flow) document that specifies the Finite State Machine (FSM) states that the adaptors require to implement the functionality specified.
b) The device adaptor, which drives the ASR/TTS engine VoiceXML implementation, in an application independent way.

Both these adaptors make use of underlying infrastructure services. These include the session manager, XSLT and XML related classes, and the application server's container framework classes.

The following design guidelines were used in this specific implementation:
1. Java (Sun's JDK 1.2.2) is used for device and application adaptor coding. Java extensions not in the standard distribution are based on the jars delivered with Web Logic.
2. Web Logic Server 5.1 provides the application server and framework for these classes (typically servlets). The Personalization Server (v 2.0) provides the Web-based PIC features upon which the multi-channel PIC (not described in this document) is based.
3. The device adaptors are application independent. The same device adaptor should work transparently with multiple applications. They implement specific instances of the state machine described in the application-specific MCML documentation. Dynamic content generation links are contained in the MCML. It should be noted that the device adaptor is application independent. No assumptions about how the application flow can be made within that subsystem. This must be tested with different EJB's and MCML flows.

Furthermore, it should be clear that the MCML flows are necessarily device independent, in that they cannot depend on a client having certain capabilities beyond a common set of lowest common denominator controls, such as:

Menus/selection lists;

Accept and back buttons;

Data entry fields, numeric, alphanumeric, and password; and

Labels and prompts:

As mentioned above, the DA (device adaptor or DMI component) is implemented as a servlet and the AA's (application adaptors or AMI components) are implemented as EJB's. All calls (with an exception described below) are therefore remote object calls, and can return remote exceptions.

The DA can also call local utility classes either to facilitate application adaptation, or to allow more MCML functionality.

The DA is responsible for generating calls to AA methods under the guidance of the MCML script currently running. Since the calls to the AA's are generated dynamically, the called method signatures must be standardized. Additionally, the exception handling must be standardized to allow the DA to respond to business, system, and authentication errors.

The DA responds to exceptions in two distinct ways:

1. It catches non-authentication exceptions, and allows the MCML to take the failure branch in the script—potentially allowing another MCML block to handle the error appropriately.
1. Authentication exceptions cause the DA to call the AA's authentication methods, which is responsible for obtaining a user session with the application using the credentials stored in the session manager by the authentication servlet. There is a limit to the number of iterations the DA will try on a given auth-exception to avoid looping forever. Authentication exceptions are identified based on the returned string signature, which must contain a unique sub-string.

As an example of a DA servlet, the following source code implements a servlet which transforms an MCL document into VoiceXML.

```
/*
*@version 1.0
*/
package com.nortel.masp.mca.servlet;
import java.io.*;
import javax.servlet.*;
import javax.servlet.http.*;
import java.util.*;
import com.icl.saxon.*;
import com.icl.saxon.output.*;
import com.icl.saxon.expr.*;
import org.xml.sax.*;
import com.nortel.masp.mca.MCML.*;
import com.nortel.masp.mca.stateManagement.*;
import com.nortel.masp.mca.util.*;
/**
* VoiceServlet. Transforms a supplied MCML document
into VoiceXML
* using the supplied stylesheet xmlServlet.xsl
*/
public class VoiceServlet extends HttpServlet {
    private static final String MCML_VTABLE =
"maspMultiChannelAccessSessionMCMLVTACBLE";
    private static final String
DEFAULT_LOGIN_METHOD_NAME_KEY = "loginMethodName";
    private static final String
DEFAULT_INDEX_MCML_KEY ="defaultIndexMCML";
    static private final String
DEFAULT_ERROR_HANDLING_MCML_KEY =
"defaultErrorHandlingMCML";
    static private final int debug = 1;
    static private final int testVersion = 0;
    static private final String INVALID_USER_MCML =
McaProperties.getInstance().getProperty("da.defaultInvalidUserMCML", "mca/invaliduser.mcml");
    static private final String ERROR_HANDLING_MCML =
McaProperties.getInstance().getProperty("da.defaultErrorHandlingMCML", "mca/errorhandler.mcml");
    static private final String INDEX_MCML =
McaProperties.getInstance().getProperty("da.defaultIndexMCML", "mca/pic.mcml");
    static private final String LOGIN_METHOD_NAME =
McaProperties.getInstance().getProperty("da.defaultLoginMethodName", "login");
    static private final String START_BLOCK_NAME =
"start";
    static private final String BLOCK_NAME = "_b";
static private final String XML_SOURCE = "_x";
    static private final String XSL_STYLE = "_1";
    static private final int MAX_COUNT = 3;
    static private final String CONTENT_TYPE =
"content-type";
    static private final String MCA_HEADER =
"mcaheader";
    static private final String XSL_EXT =".xsl";
    static private final String XML_EXT =".mcml";
    static private final String DEFAULT_APP_PATH =
McaProperties.getInstance().getProperty("da.defaultMCMLAppPath", "mca/");
/**
 * doGet() - accept request and produce
response<BR>
 * URL parameters: <UL>
 * <li>_x - URL of source document</li>
 * <li>_1 - URL of stylesheet</li>
 * <li>clear-stylesheet-cache - if set to yes,
empties the cache before running.
     * <li>URL format:
/demo?uniqueID?_x=xxx.mcml?_1=xxx.xsl?_b=start
 * </UL>
 * @param req The HTTP request
 * @param res The HTTP response
 */
    public void doGet(HttpServletRequest req,
HttpServletResponse res)
        throws ServletException, IOException
        {
            doPost(req, res);
        }
/**
 * doPost() - accept request and produce
response<BR>
 * URL parameters: <UL>
 * <li>_x - URL of source document</li>
 * <li>_1 - URL of stylesheet</li>
 * <li>clear-stylesheet-cache - if set to yes,
empties the cache before running.
 * </UL>
 * @param req The HTTP request
 * @param res The HTTP response
 */
    public void doPost(HttpServletRequest req,
HttpServletResponse res)
        throws ServletException, IOException
        {
            Log.log(Log.DEBUGGING, this.getClass(),
PrintUtil.convertToString(req));
            String source = null;
/*req.getParameter(XML_SOURCE);*/
            String style = null;
/*req.getParameter(XSL_STYLE);*/
            String blockname = null;
/*req.getParameter(BLOCK_NAME);*/
            String querystr = req.getQueryString();
```

-continued

```
        SessionStateManagerDef manager =
SessionStateManagerAbstractFactory.makeManager(req,
res),
        SessionState    state = null;
        SessionState    tmpState = new
SessionState("tmpawewe2336623233");
        boolean         bInvalidUser = false;
        // Chech if the session is created or not.
        if (!manager.isSessionStarted())
        { // Create a new session and initialize
it.
            initSession(manager);
        }
        state = manager.getCurrentState();
        if (state == null)
        {
            Log.log(Log.ERROR, getClass(), "state
== null");
            bInvalidUser = true;
            state = tmpState;
        }
        SessionState    varTable =
getVarTable(state);
        String sessionKey = state.getSessionKey();
        Log.log(Log.DEBUGGING, getClass(),
"SessionKey = " + sessionKey);
        Log.log(Log.DEBUGGING, getClass(),
"QueryString::" + querystr);
        String curur10;
        String absURL =
req.getParameter("absoluteURL");
        String hostURL = req.getScheme() + "://" +
req.getServerName() + ":"
                + req.getServerPort() +
req.getServletPath();
        if (absURL != null && absURL.equals("1"))
        {
            curur10 = hostURL;
        }
        else
        {
        curur10 = req.getServletPath();
        }
        curur10 = manager.encodeURL(curur10);
        hostURL = manager.encodeURL(hostURL);
        Log.log(Log.DEBUGGING, getClass(),
"####### New version Servlet ....My Current URL2 = " +
curur10);
        String id = null; // temporary id for test
only ===========
        ParameterSet params = new ParameterSet();
        // Check if there is a '?' in curur10
        params.put ("id", new
StringValue (generateId()));
        varTable.put("url", hostURL);
        ServletOutputStream out =
res.getOutputStream();
        Enumeration p = req.getParameterNames();
        while (p.hasMoreElements())
        {
            String name = (String)p.nextElement();
            String value = req.getParameter(name);
            if (name.equals(XML_SOURCE))
            {
                source = value;
                String tmp = null;
                try
                {
                    tmp =
(String)varTable.get(XML_SOURCE);
                }
                catch(Exception e)
                {
                    tmp = null;
                }
                if (tmp != null);
                {
                    if
(source.equals((String)varTable.get(XML_SOURCE)))
```

-continued

```
                    continue;
                }
            }
            else if (name.equals(XSL_STYLE))
            {
                style = value;
                String tmp = null;
                try
                {
                    tmp =
(String)varTable.get(XSL_STYLE);
                }
                catch(Exception e)
                {
                    tmp = null;
                }
                if (tmp != null)
                {
                    if
(style.equals((String)varTable.get(XSL_STYLE)))
                    continue;
                }
            }
            else if (name.equals(BLOCK_NAME))
            {
                blockname = value;
                // do not put the blockname into
parameterset until we start XSLT
                continue;
            }
            else if
(name.equals("clear-stylesheet-cache"))
            {
                if (value.equals("yes"))
                    clearCache();
            }
            if (value != null)
            {
                params.put(name.intern(), new
StringValue(value));
                Log.log(Log.DEBUGGING, getClass(), name +
"=" + value);
                varTable.put(name, value);
            }
            else
                Log.log(Log.DEBUGGING, getClass(), name +
"does not have its value.");
        }
        if (blockname == null && source == null)
            source = INDEX_MCML;
        if (source == null)
        {
            try
            {
                source =
(String)varTable.get(XML_SOURCE);
            } catch(Exception e)
            {
                source = INDEX_MCML;
            }
            params.put(XML_SOURCE, new
StringValue(source));
            varTable.put(XML_SOURCE, source);
        }
        if (style == null)
        {
            try
            {
                style =
(String)varTable.get(XSL_STYLE);
            }
            catch (Exception e)
            {
                // temporarily code
######################
                style = "html";
                Log.log(Log.DEBUGGING,
getClass(), "XSL style sheet is not found. Using
html.xsl as default!");
```

-continued

```
            }
            params.put(XSL_STYLE, new
StringValue(style));
            varTable.put(XSL_STYLE, style);
        }
        if (blockname == null)
        {
            blockname = START_BLOCK_NAME;
            //source = INDEX_MCML;
            //varTable.put(XML_SOURCE, source);
            Log.log(Log.DEBUGGING, getClass(),
"blockname == null, use start as block-name");
            //params.put(BLOCK_NAME, new
StringValue(START_BLOCK_NAME));
        }
    if (style.indexOf("vxml") >= 0)
        curur10 = hostURL;
    if (curur10.indexOf("?") < 0)
        curur10 = curur10 + "?_dmy=1";
    Log.log(Log.DEBUGGING, getClass(),
"==========================curur10
=====================\n" + curur10
"\n =====================curur10
=====================");
    params.put("curur10", new
StringValue(curur10));
    int innerCount = 0;
    int outCount = 0;
    do
    {
        outCount ++;
        bInvalidUser = false;
        try
        {
            // Run the MCML filter to get the
specified MCML block according to the given block
name
            String mcmlText = null;
            do
            {
                innerCount ++;
                bInvalidUser = false;
                logMsg("source =" + source);
                logMsg("_b =" + blockname);
                String path;
                if (source.indexOf(".mcml") >= 0)
                    path =
getServletContext().getRealPath(DEFAULT_APP_PATH +
source);
                else
                    path =
getServletContext().getRealPath(DEFAULT_APP_PATH +
source + XML_EXT);
                MCMLFilter mcmlFilter = new
MCMLFilter(path, blockname, manager); //varTable);
                try
                {
                    mcmlText = mcmlFilter.run();
                }
                catch (InvalidUserException e)
                    Log.log(Log.ERROR,
getClass(), e);
                    // Invalid user
                    bInvalidUser = true;
                    source = INVALID_USER_MCML;
                    blockname =
START_BLOCK_NAME;
                }
                catch (NoBlockException e)
                {
                    Log.log(Log.ERROR,
getClass(), e);
                    bInvalidUser = true;
                    source =
ERROR_HANDLING_MCML;
                    blockname =
START_BLOCK_NAME;
                }
                catch (UserDefinedBlockException e)
                {
            String gotoStr =
e.toString().substring(e.toString().indexOf(":") +
1).trim();
            System.out.println("######################UserDefined
Block
handling#############################################
#########");
            System.out.println(gotoStr);
            System.out.println("##############################
##########################################");
            StringTokenizer gotoParams =
new StringTokenizer(gotoStr, "&");
            params.clear();
            params.put("curur10", new
StringValue(curur10));
            params.put("id", new
StringValue(generateId()));
            String prevSource = source;
            String prevBlockname =
blockname;
            while
(gotoParams.hasMoreTokens())
            {
                StringTokenizer
oneParamToken = new
StringTokenizer(gotoParams.nextToken(), "=");
                String name =
oneParamToken.nextToken();
                String value = null;
                if
(oneParamToken.hasMoreTokens())
                {
                    value =
oneParamToken.nextToken();
                }
                if
(name.equals(XML_SOURCE))
                {
                    source =
value;
                    String tmp =
null;
                    try
                    {
                        tmp =
(String)varTable.get(XML_SOURCE);
                    }
                    catch(Exception re)
                    {
                        tmp =
null;
                    }
                    if (tmp !=
null)
                    {
                        if
(source.equals((String)varTable.get(XML_SOURCE)))
                            continue;
                    }
                }
                else if
(name.equals(XSL_STYLE))
                {
                    style =
value;
                    String tmp =
null;
                    try
                    {
                        tmp =
(String)varTable.get(XSL_STYLE);
                    }
                    catch(Exception re)
                    {
                        tmp =
null;
                    }
                    if (tmp !=
```

-continued
```
null)
               {
(style.equals((String)varTable.get(XSL_STYLE)))
continue;
                               }
                       }
                       else if
(name.equals(BLOCK_NAME))
                       {
                               blockname =
value;
                               // do not put
the blockname into parameterset until we start XSLT
                               innerCount =
0;
                               bInvalidUser
= true;
                               continue;
                       }
                       varTable.put(name,
value);
params.put.name.intern(), new StringValue(value));
                       }
                       if (!bInvalidUser ||
(prevBlockname.equals(blockname) &&
prevSource.equals(source)))
                               throw new Exception();
               }
               catch(Exception e)
               {
                       Log.log(Log.ERROR,
getClass(), e);
                       bInvalidUser = true;
                       source =
ERROR_HANDLING_MCML;
                       blockname =
START_BLOCK_NAME;
               }
       } while (bInvalidUser && innerCount <
MAX_COUNT);
               }
               }
               }
               if (innerCount >= MAX_COUNT)
               {
                       innerCount = 0;
                       throw new Exception("Block (" +
blockname + ") is not found in " + source);
               }
               params.put(BLOCK_NAME, new
StringValue(blockname));
               varTable.put(BLOCK_NAME, blockname);
               apply(style, mcmlText, params, req,
res, state) ;
       }
       catch(Exception e)
       {
               varTable.put("_errorString",
e.toString());
               Log.log(Log.ERROR, getClass(), e);
               if
(source.indexOf(ERROR_HANDLING_MCML) >= 0)
                       bInvalidUser = false;
               else
               {
                       bInvalidUser = true;
                       source = ERROR_HANDLING_MCML;
                       blockname = START_BLOCK_NAME;
                       params.clear();
                       params.put("curur10", new
StringValue (curur10));
                       params.put("id", new
StringValue(generateId()));
                       params.put(XML_SOURCE, new
StringValue(source));
                       params.put(XSL_STYLE, new
StringValue(style));
                       //params.put(BLOCK_NAME, new
StringValue(blockname));
               }
       }
       //params = createNewParams(blockname);
       } while (bInvalidUser && outCount <
MAX_COUNT);
       manager.saveState();
}
private void initSession( SessionStateManagerDef
manager)
{
               manager.startSession();
               SessionState state =
manager.getCurrentState();
state.put(DEFAULT_LOGIN_METHOD_NAME_KEY,
LOGIN_METHOD_NAME);
                       state.put(DEFAULT_INDEX_MCML_KEY,
INDEX_MCML);
                       state.put(
DEFAULT_ERROR_HANDLING_MCML_KEY,
ERROR_HANDLING MCML);
}
/**
* getServletInfo<BR>
* Required by Servlet interface
*/
public String getServletInfo() {
       return "Calls SAXON to apply a stylesheet to
a source document";
}
/**
* Apply stylesheet to source document
*/
private void apply(String style, String source,
                       ParameterSet params,
                       HttpServletRequest req,
                       HttpServletResponse res,
                       SessionState varTable)
       throws SAXException, java.io.IOException
{
       ServletOutputStream out =
res.getOutputStream();
       if (style==null)
       {
               out.println("No style parameter
supplied");
               return;
       }
       if (source==null)
       {
               out.println("No source parameter
supplied");
               return;
       }
       try
       {
               StringWriter strout = new
StringWriter();
               PrintWriter pout = new
PrintWriter(strout);
               try
               {
                       String contentType =
(String)varTable.get(CONTENT_TYPE);
                       String mcaHeaderFileName =
(String)varTable.get(MCA_HEADER);
                       String mcaFilePath =
getServletContext().getRealPath(DEFAULT_APP_PATH +
mcaHeaderFileName);
                       FileReader in = null;
                       try
                       {
                               in = new
FileReader(mcaFilePath);
                       }
                       catch(FileNotFoundException e)
                       {
varTable.put("_errorString", e.toString());
                               throw e;
                       }
```

```
                    BufferedReader bufIn = new
BufferedReader(in);
                    // Read the header
                    String rdln;
                    while ((rdln =
bufIn.readLine()) != null)
                    {
                        pout.println(rdln);
                    }
                    // set content type
res.setContentType(contentType);
                }
                catch (Exception e)
                { // If there is no content-type
passed from sessionState, we hardcode it here.
///////////////////////////////////////////////
///////////////////////////////////
                    Log.log(Log.DEBUGGING, getClass(),
"###### content-type and mcaheader from auth
servlet are not correctly" );
                    if (style.indexOf("vxml") >= 0)
                    {
                        pout.println("<?xml
version=\"1.0\"?>");
res.setContentType("text/vxml");
//setContentType("text/vnd.wap.wml");
                    }
                    else if (style.indexOf("wml") >= 0)
                    { // for wml
                        pout.println("<?xml
version=\"1.0\"?>");
                        pout.println("<!DOCTYPE wml
PUBLIC \"-//WAPFORUM//DTD WML 1.1//EN\"
\"http://www.wapforum.org/DTD/wml_1.1.xml\">");
res.setContentType("text/vnd.wap.wml");
//setContentType("text/vnd.wap.wml");*/
/*setContentType(details.getMediaType());
                    }
                    else if (style.indexOf("hdml") >= 0)
                    { // for hdml
                        pout.println("<?xml
version=\"1.0\"?>");
                        pout.println("<!DOCTYPE wml
PUBLIC \"-//WAPFORUM//DTD WML 1.1//EN\"
\"http://www.wapforum.org/DTD/wml_1.1.xml\">");
res.setContentType("text/x-wap.wml");
//setContentType("text/vnd.wap.wml");
setContentType(details.getMediaType());
                    }
                    else
                    {
res.setContentType("text/html");
//setContentType("text/vnd.wap.wml");
setContentType(details.getMediaType());
                    }
///////////////////////////////////////////////
//////////////////////////////////
                }
                    PreparedStyleSheet pss =
tryCache(style);
                    StyleSheetInstance ssi =
pss.makeStyleSheetInstance();
                    OutputDetails details =
pss.getOutputDetails();
                    details.setWriter (pout);
                    ssi.setOutputDetails(details);
                    ssi.setParams(params);
                    Log.log(Log.DEBUGGING, getClass(),
"The input MCML as follows\n" +
"=================MCML
BEGINNING=================\n" +
source + "\n" +
"==================MCML END==================="
                };
                    StringReader sourceReader = new
StringReader(source);
                    ssi.transform(new
ExtendedInputSource(sourceReader));
                    String xmlstr;
                    xmlstr = strout.toString();
                    pout.close();
                    sourceReader.close();
                    Log.log(Log.DEBUGGING, getClass(),
                            "========The result
after XSLT ========\n"
                            + xmlstr
                            +
"\n============END================");
                    PostProcess postProc = new
PostProcess(req, res, varTable);
                    try
                    {
                        postProc.run(xmlstr);
                    }
                    catch (ServletException err)
                    {
res.getOutputStream().println("Error MethodProcess: " +
err.getMessage());
                    }
                }
                catch (SAXException err)
                {
                    throw err;
//out.println(err.getMessage());
                }
            }
            // first get unique ID from URL
            // if there is no id=XX, it means this
request is from a new session
            // if there is an id, then try to llok up
MCMLVariables table, if the
            // table is not found. The request is
treated as a new request.
            /*
            */
            public SessionState getVarTable(SessionState
state)
            {
                if (testVersion == 0)
                    return state;
                else
                    return gMCMLtable;
            }
            /**
             * Maintain prepared stylesheets in memory for
reuse
             */
            private synchronized PreparedStyleSheet
tryCache(String url) throws SAXException {
                String path;
                if (url.indexOf(".xsl") >= 0)
                    path =
getServletContext().getRealPath(DEFAULT_APP_PATH +
url);
                else
                    path =
getServletContext().getRealPath(DEFAULT_APP_PATH +
url + XSL_EXT);
                if (path==null)
                {
                    throw new SAXException("Stylesheet " +
path + " not found");
                }
                PreparedStyleSheet x =
(PreparedStyleSheet)cache.get(path);
                if (x==null)
                {
                    x = new PreparedStyleSheet();
                    x.prepare(new ExtendedInputSource(new
File(path))),
                    cache.put(path, x);
                }
                return x;
            }
            private void logMsg(String logInfo)
            {
                Log.log(Log.DEBUGGING, getClass(),
logInfo);
```

```
            }
            private synchronized String generateId()
            {
                Date tm = new Date();
                Long ln = new Long(tm.getTime());
                return ln.toString();
            }
        /**
         * Clear the cache. Useful if stylesheets have
    been modified, or simply if space is
         * running low. We let the garbage collector do
    the work.
         */
            private synchronized void clearCache()
            {
                cache = new Hashtable();
            }
            private static SessionState gMCMLtable = new
    SessionState("12345676878999");
            private Hashtable cache = new Hashtable();
    }
```

To create proper EJB's which can be called from a DA, the following guidelines apply:

1) All EJB methods must have the following signature:

String EJBMethodName(SessionStateManagerDef manager, Properties params)

throws CreateException, RemoteException, RemoveException

Error handling:

The Device Adaptor uses two ways to check whether the EJB call fails:

Catch an exception from the EJB method

Check if the return value is null

Parameter passing:

The method should get its associated parameters from the params Properties according to its corresponding parameter name. An alternate mechanism for data passing between method calls is to use the SessionStateManager to store state data between calls.

The follow ng example illustrates the latter for getting a username and password:

SessionState state;

state=manager.getCurrentState( );

String username=(String)state.get("username");

String password=(String)state.get("password");

2) Each application EJB must implement an authentication method. The signature is as follows:

String login(SessionStateManagerDef manager, Properties params)

throws CreateException, RemoteException, RemoveException

This method is be called by the DA if the EJB method fail to find an active session in the Session State, as a result of the session manager throwing an exception which is passed up to the DA.

3) The proper MCML Syntax for making EJB or Class method call must be followed.

The following MCML block gives an example of a call to the getSummaries in CalendarEJB.

```
        <block blocktype="userDefinedBlock"
    blockname="getsummaries">
            <properties/>
            <action>
            <method name="getSummaries" type="ejb"
    interface="com.nortel.masp.mca.CalendarRemote"
    jndi="mca.CalendarHome"> <params>
            <param
    name="applicationURL=http://wleey006.ca.Nortel.com"
    type="text"/>
                                <param name="port=81"
    type="text"/>
                                <param name="date" type="text"/>
                </params>
                    <result name="summariesmenu"/>
                </method>
            </action>
            <nextblocks>
                <success goto="saysummaries"/>
                <failure goto="noappointment"/>
            </nextblocks>
        </block>
```

The "interface" attribute in the method element specifies the remote interface of an EJB. The "jndi" attribute specifies the JNDI_NAME for the EJB. To create classes which are callable from the DA through the MCML scripts (or broker modules), the following guidelines apply:

The DA may be used to invoke non-EJB classes, that can serve to enhance its functionality. These classes are called under the control of an MCML script, in the same way as an AA is called. These classes must follow the rules below:

1) The methods must handle all the exception internally. The DA does NOT catch any exceptions thrown.

2) The methods only have one input parameter—Properties params.

All the parameter the method needs have to get from the passed properties.

For example: toSpeakableDate( ) is in the com.Nortel.masp.mca.MCML.MCMLutils class and is defined as follows:

```
    public String toSpeakableDate(Properties params)
    {
        String theDateStr = params.getProperty("date");
        String theReturnStr = null;
        . .
        return theReturnStr;
    }
    The associated MCML required is as follows:
            <block blocktype="MenuBlock"
    blockname="verifydate">
            <action>
    <method name="toSpeakableDate"
    interface="com.nortel.masp.mca.MCML.MCMLutils">
                <params>
                    <param name="date" type="text"/>
                </params>
                <result name="speakableDate"/>
            <method>
            </action>
            <prompt>
                <message msgtype="text" content="Your
    entered date is {$speakableDate}."/>
    <message msgtype="text" content="If it is correct,
    please say yes, otherwise say no."/>
            </prompt>
            <menuitems>
                    <menu title="yes" id="yes"/>
                    <menu title="no" id="no"/>
            </menuitems>
            <choices>
                    <nextblock id="yes"
    goto="getsummaries"/>
                    <nextblock id="no"
```

-continued

```
            goto="askfordate"/>
        </choices>
    </block>
```
An example of a simple MCML workflow that includes an EJB call action is provided below : ( test.mcml)
```
<?xml version= "1.0"?>
<mcml>
    <FSMFlow>
        <block blocktype="UserDefinedBlock" blockname="start">
            <action>
                <method name="getSummaries" type="ejb"
                interface="com.nortel.masp.mca.MyCalendarRemote"
                jndi="mca.MyCalendarHome">
                    <params>
<!--param name="remote=com.nortel.masp.mca.CalendarRemote" type="text"/-->
                        <!--param name="jndi=mca.CalendarHome" type="text"/ -->
                        <param name="CalendarURL=http://wleey006.ca.nortel.com" type="text"/>
                        <param name="port=81" type="text"/>
                        <param name="username=demo" type="text"/>
                        <param name="password=new2day" type="text"/>
                        <param name="date" type="text"/>
                    </params>
                    <result name="summariesmenu"/>
                </method>
            </action>
            <nextblocks>
                <success goto="saysummaries"/>
                <failure goto="saynoappointment"/>
            </nextblocks>
        </block>
        <block blocktype="DisconnectBlock" blockname="disconnect">
            <disconnect/>
        </block>
    </FSMFlow>
</mcml>
```

Regarding the application adaptor or the AMI component, an example is provided which utilizes the Calendar, E-mail and Contact List as the application.

These applications may have the following capabilities:
Calendar Express:
  get appointment summaries for a given date incrementally (limited by client's buffer size)
  get details (location, start, end, summary, text) for a given appointment based on start time
  set an appointment for a given date and time using standard locations and summaries
E-mail:
a) indicate how many unread messages you have
b) set current mailbox
  get summary lines (headers) and message ids for unread or for all messages in a mailbox incrementally (limited by client's buffer size)
d) get message text based on message id or next message in a mailbox or next unread message
e) delete the current message (akin to voice mail deletes on the current message)
f) send standard reply to a message based on message id
Contact list:
get contact list incrementally (limited by client's buffer size)
  get detail information for a given contact name
  send a standard message to a person in the contact list
  prepare a receiver list for an e-mail based on the contact list
  add the sender's name to the contact list based on a received e-mail id number This example assumes that the application session is available to the adaptor through a session id mechanism described elsewhere. Also, the example assumes the following:

Populating fields in the session manager's database does the application and user provisioning.
  The standards based API's used here to interface with the email application (SMTP and IMAP4)
  No special client software is assumed (or indeed possible in most cases) on the target. Since some channels may have inherent limitations from a user-interface point of view, i.e.:
    a) one-at-a-time menu selection capability,
    b) data entry capability is limited (to approximately 100 words) vocabulary for acceptable speaker-independent recognition The session manager described above has, relative to the application adaptor, the following functions:
  1. Maintains the end-user specific configuration.
  2. User authentication into the application. Using a session id, the application adaptors can use the session manager to access applications, using existing subsystems like APM.
  3. Dynamic session instance management. The session manager can be used to store dynamic session state information on behalf of the application adaptor. The "handle" into that state information is the session id, obtained through the PIC.
  4. User profile management. Profiles are created and populated via the MIC and BIC interface in the completed system, but would be manually populated for the interim release checkpoints, and for testing purposes. Web-based provisioning is assumed to be as provided by MASP 1.1. Examples of configuration fields on a per-user basis would consist of:
    a) Predefined (by user) e-mail responses;
    b) Predefined (by user) appointment summaries and locations;
    c) List of enabled applications, and URI's on a per-channel basis;
    d) Time-out values for application access;
    e) Application specific instance fields (containers). For example "session-id".

To access the applications, the application adaptors must accomplish the following:
Application: Calendar:
Functions:
  a) Get appointment summaries (headers) based on session id and date
  b) Get appointment detail, based on session id, appointment date and time
  c) Set an appointment, based on session id, appointment date and time, and input appointment data fields
Application: e-mail
Functions:
  a) Set a mailbox to be current based on session id, and mailbox id
  b) Get the number of unread messages in all mailboxes, or in the specified mailbox, based on session id and mailbox name.

c) Get message summaries, based on session id, mailbox name. Get summaries for all messages (unless unread-only flag is set). Provision to do this incrementally is provided to account for device buffer limitations.

Application: Contact List:

Functions:

a) Get names in contact list incrementally based on session id, and number of entries (limited by client's buffer size)

c) Get detail on a given name, based on session id and contact name d) add a name to the contact list based session id and contact name.

As noted above, the application adaptor consists of a set of Stateless Session Beans that communicate with the applications. The broker module consists of a MCML (XML multi-channel application flow) document that specifies the Finite State Machine (FSM) states that the application adaptors require to implement the functionality specified.

The device adaptors use the application adaptors to present device-specific drives the ASR-TTS engine (VoicePortal), in an application independent way.

The application adaptors described here are implemented as Stateless Session Enterprise Java Beans deployed within a Java-based application server, and communicate with the target applications on the "back-end". The EJB's abstract the application interface presented to the device adaptors and are written once per application such that different device adaptors without modification may use them. The user's flow through the application is guided by the broker module which is an MCML (multi-channel mark-up language) XML document that contains references to the EJB's. It is the MCML document that guides the device adaptor in its sequence of calls to the EJB's, which are effectively action methods used to generate dynamic content for the application flow.

In this example, the following design guidelines were applied:

1. Java (Sun's JDK 1.2.2) is used for device and application adaptor coding.
2. The J2EE 2.0 specification for EJB interface and deployment is adhered to.
3. Web Logic Server 5.1 provides the application server and container framework for these classes. The Personalization Server (v 2.0) provides the Web-based PIC (Personal Interaction Portal) features upon which the multi-channel PIC is based.
4. The application adaptor EJB's are stateless, in that any device-side method call can be made at any time. State is maintained outside the EJB's, in the unique Session Manager. Therefore EJB's can be replicated and clustered.
5. The device adaptors are application independent. The same device adaptor should work transparently with multiple applications. They implement specific instances of the state machine described in the application-specific MCML document—see below.
6. The application's workflow is contained within the MCML document that can be obtained by calling the application's EJB. This flow describes a set of states and associated controls and actions that the device adaptor can choose to implement.
7. All EJB's must use the session manager to store state or instance information. No instance variables are allowed. The EJB's should be clusterable across different servers and operate with a single logical session manager.

The following code is that of a Java bean for the calendar application

```
/**
* CalendarBean -- implement the methods in this
interface as well as providing
* the implementation of the business methods.
*@
*@version 1.0
*/
package com.nortel.masp.mca.ejb;
import javax.ejb.*;
import java.rmi.Remote;
import java rmi.RemoteException;
import javax.naming.InitialContext;
import javax naming.NamingException;
import java.io.*;
import java.util.*;
import java.text.*;
import java.net.URL;
import com.nortel.masp.mca.stateManagement.*;
import com.nortel.masp.mca.util.*;
import com.nortel.masp.mca.MCML.XMLTranslater;
//import org.xml.sax.*;
//import org.xml.sax.helpers.*;
public class MyCalendarBean implements SessionBean{
    static private String SESSIONID =
"CalendarSessionUserIDCLIENT";
    static private String CONNECTURLSTR =
"CalendarSessionConnectionURLStringCLIENT";
    static private String CALENDARID =
"CalendarUserIDCLIENT";
    static private String USERNAME =
Constants.MCA_USERID_KEY;
    static private String PASSWORD =
Constants.MCA_PASSWORD_KEY;
    static private String APPURL =
Constants.MCML_APPURL_TAG;
    static private String PORT = "port";
    static private String DATE = "date";
    static private String EVENTID = "eventid";
    static private String[ ] monthStr={"January",
"February", "March", "April", "May", "June", "July",
"August", "September",
                "October", "November", "December"};
    static private int m_GMT_offset = -5; //
Eastern time of Canada
    private SessionContext ctx = null;
    private String userSessionId = null;
      private boolean loginSucceed;
      private boolean logoutSucceed;
    private String url;
      private String port;
      private String curDate;
      private String calendarId;
      private boolean bhasEvent;
    public void ejbActivate( ) {
            log("CalendarBean activated");
    }
    public void ejbRemove( ) {
            log("CalendarBean Removed");
            // logout of Calendar
    }
    public void ejbPassivate( ) {
            log("CalendarBean Passivate");
    }
        /**
        * Sets the session context.
        *
        * @param SessionContext
        */
    public void setSessionContext(SessionContext context) {
            log("CalendarBean Context set");
            ctx = context;
        }
    public void ejbCreate( ) throws CreateException {
    }
        public String
getSummaries(SessionStateManagerDef manager,
```

```
Properties params)
    {
log("################getSummaries( ) Inside
EJB###############");
                SessionState state =
manager.getCurrentState( );
                String theDate =
params.getProperty(DATE);
                Calendar localTime =
Calendar.getInstance(TimeZone.getDefault( ));
                Integer year, month, day;
                int curYear =
localTime.get(Calendar.YEAR); // because the default
year from VXML is 2001
                year = new Integer(curYear);
///Integer( theDate.substring(0, 4));
                month = new Integer(
theDate.substring(4, 6));
                day = new Integer(
theDate.substring(6, 8));
//              System.out.print("year = ");
//              System.out.print("month = ");
//              System.out.print("day = ");
                userSessionId =
(String)state.get(SESSIONID);
                log(SESSIONID + "=" + userSessionId);
                url =
(String)state.get(CONNECTURLSTR);
                bhasEvent = false;
                String retStr =
getSummaries(year.intValue( ), month.intValue( ),
day.intValue( ));
                log("Result:");
                log(retStr);
                if (!bhasEvent)
                    retStr = null;
                if (retStr != null)
                {
                    XMLTranslater translator =
new XMLTranslater( );
                    try
                    {
                        retStr =
translator.translate(retStr, "calsummary.xsl");
                            log("MCML output:");
                            log(retStr);
                    }
                    catch(Exception e)
                    {
                        retStr = null;
                        e.printStackTrace( );
                    }
                }
                log("##################End of
getSummaries( ) Inside EJB###############");
                return retStr;
        }
    public String getDetail(SessionStateManagerDef
manager, Properties params)
        {
//log("#################getDetail( ) Inside
EJB###############");
                SessionState state =
manager.getCurrentState( );
                String theDate =
params.getProperty(DATE);
                userSessionId =
(String)state.get(SESSIONID);
                //log(SESSIONID + "=" +
userSessionId);
                url =
(String)state.get(CONNECTURLSTR);
                String eventId =
(String)params.get("UID");
                calendarId =
(String)state.get(CALENDARID);
                log("UID = " + eventId);
                bhasEvent = false;
                String retStr =
getEvent(userSessionId, eventId);
                log("Result:");
                log(retStr);
                if (!bhasEvent)
                    retStr = null;
                if (retStr != null)
                {
                    XMLTranslater translator =
new xMLTranslater( );
                    try
                    {
                        retStr =
translator.translate(retStr, "caldetail.xsl");
                            log("MCML output:");
                            log(retStr);
                    }
                    catch(Exception e)
                    {
                        retStr = null;
                        e.printStackTrace( );
                    }
                }
                log("##################End of
getDetail( ) Inside *EJB###############");
                return retStr;
        }
    public boolean login(SessionStateManagerDef
manager, Properties params)
        {
                SessionState state =
manager.getCurrentState( );
                String username =
params.getProperty(USERNAME);
                if (username = = null)
                    username =
(String)state.get(USERNAME);
                String password =
params.getProperty(PASSWORD);
                if (password = = null)
                    password =
(String)state.get(PASSWORD);
                String port =
params.getProperty(PORT);
                String appURL = null;
                try
                {
                    appURL =
(String)state.get(APPURL);
                        log("appUrl = " + appURL);
                }
                catch(Exception e)
                {
                    appURL = null;
                }
                if (appURL = = null)
                    appURL=
params.getProperty(APPURL);
                log("appUrl= " + appURL);
                URL myUrl = null;
                try
                {
                    myUrl = new URL(appURL);
                }
                //catch(MalformedURLException e)
                catch(Exception e)
                {
                    e.printStackTrace( );
                    return false;
                }
                port = toString(myUrl.getPort( ));
                appURL = myUrl.getProtocol( ) + "://" +
myUrl.getHost( );
                boolean bRet = login(appURL, port, username,
password);
                if (bRet)
                {
                    state.put(SESSIONID, userSessionId);
                    state.put(CONNECTURLSTR, url);
                    state.put(CALENDARID, calendarId);
```

```
            } else {
                int at =
username.indexOf("@");
                if( at > 0) {
                    username =
username.substring( 0, at );
                    bRet = login(appURL,
port, username, password);
                    if(bRet) {
state.put(SESSIONID, userSessionId);
state.put(CONNECTURLSTR, url);
state.put(CALENDARID, calendarId);
                    }
                }
            }
            Log.log(Log.DEBUGGING, getClass( ),
"################## iPlanet Username =" +
username + "#############");
            return bRet;
        }
        /**
         * Get a specific day's summaries from 00:00:00 ->
23:59:59
         * @ param int year
         * @ param int month
         * @ param int day
         */
        private String getSummaries(int year, int month,
int day ) {
            log("userSessionID = " + userSessionId);
                System.out.print("year=");
System.out.print(year);
                System.out.print("month=");
System.out.print(month);
                System.out.print("day=");
System.out.print(day);
            String strRetrieveSummary =
retrieveSummaryString(userSessionId, year, month,
day);
            return urlConnection(strRetrieveSummary,
"Summary");
        }
        /**
         * Get a specific event based on session ID and event ID
         * @param String session ID
         * @param String event ID
         */
        private String getEvent(String sessionId, String eventId) {
            String strEvent = eventString(sessionId, eventId);
            return urlConnection(strEvent, "Event");
        }
//http://wleey006:81/login.wcap?user=wbin&password=
new2day&refresh=1&fmt-out=text/xml
        private String loginString(String url, String
port, String user, String password) {
            StringBuffer buffer = new StringBuffer (url);
buffer.append(":").append(port).append("/login.wcap?");
buffer.append("user=").append(user).append("&").append
("password=").append(password);
buffer.append("&refresh=1&fmt-out=text/xml");
            return buffer.toString( );
        }
//
http://wleey006:81/fetchevents_by_id.wcap?id=sessionId&uid=
eventId&rid=0&mod=1&calid=wbin&brief=0&fmt-out=text/xml
        private String eventString(String sessionId, String eventId) {
            StringBuffer buffer = new StringBuffer(url);
buffer.append(":").append(port).append("/fetchevents_by_id.wcap?");
buffer.append("id=").append(sessionId).append("&").append("uid=
").append(eventId);
buffer.append("&rid=0").append("&mod=1").append("&calid=
").append(calendarId);
                buffer.append("&brief=0&fmt-out=text/xml");
                return buffer.toString( );
        }
//http://wleey006:81/logout.wcap?id=n32nv9q3b2r5po32oq3&fmt-out=
text/xml
        private String logoutString( ) {
            StringBuffer buffer = new StringBuffer(url);
buffer.append(":").append(port).append("/logout.wcap?");
            buffer.append("id=").append(userSessionId);
            buffer.append("&fmt-out=text/xml");
            return buffer.toString( );
        }
//http://wleey006:81/fetchcomponents_by_range.wcap?id=
t9u9s6he2r5pu9b&dtstart=19990331T112233&dtend=20010331T112233&
fmt-out=text/xml&maxResults=0
//retrieve components from calendar
        private String retrieveSummaryString(String id, int year, int month,
int day) {
            String start = getFormatedTime(year, month, day, 0, 0, 0);
            String end = getFormatedTime(year, month, day, 23, 59, 59)
            StringBuffer buffer = new StringBuffer(url);
buffer.append(":").append(port).append("/fetchcompon-
ents_by_range.wcap?");
            buffer.append("id=").append(id);
            buffer.append("&dtstart=").append(start).append
("&dtend=").append(end);
            buffer.append("&fmt-out=text/xml&maxResults=0");
                return buffer.toString( );
        }
/*
            http://myserver:81/storecomponents.wcap?id=
3423423asdfasf&calid=John1&dtstart=19990101T103000&dtend=
19990101T113000&uid=001&summary=new_year_event
*/
/*      private String storeComponentString(String url, String port, String
sessionId, String user, String password,
                    String year, String month, String day, String
eventId, String summary) {
            String start = getFormatedTime(year, month, day, 0, 0, 0);
            String end = getFormatedTime(year, month, day,
23, 59, 59);
            StringBuffer buffer = new StringBuffer(url);
buffer.append(":").append(port).append("/storecompon-
ents.wcap?id=").append(sessionId);
                buffer.append("&dtstart=").append(start).append
("&dtend=").append(end);
                buffer.append("&uid=").append(eventId).append
("&summary=").append(summary);
                return buffer.toString( );
        }
*/
/*
http://myserver:81/storeevents.wcap?id='bu9p3eb8x5p2nm0q3'&calid=
newcal&uid=all_params&dtstart=19990811T093000Z&dtend=
19990811T163006Z
&summary=all%20params-of-storeevents%20are%20included
            &location=Mountain-View&icsClass=confidential&icsUrl=
            http://www.mycompany.com
&duration=PT7H&desc=read%20the%20summary&status=0&isA
11Day=1
            &geo=37.39;-122.05&rrules=
"count%3D4%3Bfreq%3Ddaily";"count%3D4%3Bfreq%3Dweekly"
&exrules="count%3D1%3Bfreq%3Dweekly%3Binter-
val%3D2%3Bbyday%3DTU%2CTH"
&rdates=19991015T093000&exdates=19990813T093000&priority=
10
&relatedTos=<777>&resources=board;projector&categories=
MEETING
&contacts=Jane\,John&&alarmStart=19990811T092500Z
&alarmEmail=lucys@mycompany.com&orgEmail=jane@
mycompany.com;
*/
/*      private String storeEventString(,,,,,,,,,,,,,) {
                String start = getFormatedTime(year, month, day, 0, 0, 0);
                String end = getFormatedTime(year, month, day,
23, 59, 59);
                return buffer.toString( );
        }
*/
        /**
         * urlConnection to Calendar server with given URL,
callType
         * @param String url for the server
         * @param String call type
         */
        private String urlConnection(String strUrl, String call) {
```

```
            String retStr = null;
        try{
            URL url = new URL(strUrl);
//"http://wleey006.ca.nortel.com:81/login.wcap?user=wbin&password=
new2day&refresh=1&fmt-out=text/xml");
            InputStream in = url.openStream( );
            BufferedReader bufReader
                        = new BufferedReader(new
InputStreamReader(in));
//          DataInputStream data_in = new
DataInputStream(in);
            java.util.Vector contents = new java.util.Vector( );
            StringBuffer xmlString = new StringBuffer( );
            PrintWriter output = null;
            String sessionLine = " ";
                String loginLine = " ";
                String logoutLine = " ";
                StringWriter strout = new StringWriter( );
            if(call.equals("Login")) {
                //output = new PrintWriter(new
BufferedWriter(new FileWriter("login.xml")));
                output = new PrintWriter(strout);
            }
            if (call.equals("Summary")) {
                //output = new Printwriter(new
BufferedWriter(new FileWriter("Summary.xml")));
                output = new PrintWriter(strout);
                //log("PrintWriter is created for Summary.xml\n");
            }
            else {
                if(call.equals("Event")) {
                    //output = new
PrintWriter(new BufferedWriter(new
FileWriter("Event.xml")));
                            output = new
PrintWriter(strout);
                            //log("PrintWriter is
created for Event.xml\n");
                }
            }
            String line ;
                boolean bflag = false;
                while((line = bufReader.readLine( )) != null) {
                    // Too dirty, too much if.
                    log(line);
                    contents.addElement(line);
                    if (call.equals("Login")) {
                        output.println(line);
if(line.startsWith("X-NSCP-WCAP-SESSION-ID>"))
                            sessionLine = line; //
found the line that contains sesssionID
                            else
if(line.startsWith("X-NSCP-WCAP-ERRNO>"))
loginLine = line;
                                else if
(line.indexOf("<X-NSCP-WCAP-CALENDAR-ID>") >= 0)
                                    { // get
calendar ID
                                            int
first = line.indexOf(">") + 1;
                                            int
last = line.lastIndexOf("<");
calendarId = line.substring(first, last);
log("Calendar id =" + calendarId);
                    }
                }
                else if( call.equals("Event"))
                    {
                        if
(line.indexOf("<START") >= 0)
                            {
bhasEvent = true;
log("processing <START>........</START>");
StringBuffer humanTime = new StringBuffer( );
                                            int
last = line.indexOf("</START>");
String theTime = line.substring(7, last −1);
log("TimeString = " + theTime);
theTime = ToHumanTime(theTime);
```

```
humanTime.append("<APPDATE>");
humanTime.append(curDate);
humanTime.append("</APPDATE>");
                                                    line =
humanTime.toString( );
output.println(line);
humanTime = new StringBuffer( );
humanTime.append("<APPTIME>");
humanTime.append(theTime);
humanTime.append("</APPTIME>");
                                                    line =
humanTime.toString( );
output.println(line);
                                                }
                                            else if
(line.indexOf("<END") >= 0)
                                                {
bhasEvent = true;
log("processing <END>........</END>");
StringBuffer humanTime = new StringBuffer( );
                                                    int
last = line.indexOf("</END>");
String theTime = line.substring(5, last −1);
log("TimeString = " + theTime);
theTime = ToHumanTime(theTime);
humanTime.append("<APPENDDATE>");
humanTime.append(curDate);
humanTime.append("</APPENDDATE>");
                                                    line =
humanTime.toString( );
output.println(line);
humanTime = new StringBuffer( );
humanTime.append("<APPENDTIME>");
humanTime.append(theTime);
humanTime.append("</APPENDTIME>");
                                                    line =
humanTime.toString( );
output.println(line);
                                                else
output.println(line);
                                            }
                                        else if( call.equals("Summary"))
                                            {
                                                if
(line.indexOf("<EVENT") >= 0)
bflag = true;
                                                if
(line.indexOf("</EVENT") >= 0)
bflag = false;
                                                if (bflag &&
line.indexOf("<START") >= 0)
                                                    {
bhasEvent = true;
log("processing <START>........</START>");
StringBuffer humanTime = new StringBuffer( );
                                                            int
last = line.indexOf("</START>");
String theTime = line.substring(7, last −1);
log("TimeString = " + theTime);
theTime = ToHumanTime(theTime);
humanTime.append("<APPDATE>");
humanTime.append(curDate);
humanTime.append("</APPDATE>");
                                                            line =
humanTime.toString( );
output.println(line);
humanTime = new StringBuffer( );
humanTime.append("<APPTIME>");
humanTime.append(theTime);
humanTime.append("</APPTIME>");
                                                            line =
humanTime.toString( );
                                                }
                                            else
output.println(line);
                                            }
                                        else if(
call.equals("Logout")) {
if(line.startsWith("X-NSCP-WCAP-ERRNO>"))
```

-continued

```
                                logoutLine = line;
                      }
            }
                        retStr = strout.toString( );
            output.close( );
            if ( call.equals("Login")) {
                        loginLine =
getValue(loginLine, "<X-NSCP-WCAP-ERRNO>");
if(loginLine.equals("0"))
                        loginSucceed =
loginLine.equals("0")? true: false;
                        if( loginSucceed)
                              userSessionId =
getValue(sessionLine, "<X-NSCP-WCAP-SESSION-ID>");
                              //log("User Session
ID = " + userSessionId + " And loginSucceed=" + loginSucceed);
            }
                  /*
            if( call.equals("Logout")) {
                        log("Logout is executed");
                        logoutLine =
getValue(logoutLine, "<X-NSCP-WCAP-ERRNO>"); log("The
logout line is : " + logoutLine);
                        logoutSucceed =
logoutLine.equals("-1")? true: false;
            }
            */
            bufReader.close( );
            // log(retStr);
                  return retStr;
      }catch(Exception ex) {
      }
                  return null;
      }
            /**
            * getValue to get session ID from input line
            * @param String line containning session ID
            * @return String session ID
            */
      public String getValue(String selectedLine, String tag) {
            String idstring = null;
            try {
                  //X-NSCP-WCAP-SESSION-ID>
                        //X-NSCP-WCAP-ERRNO
                  //String temp =
"<X-NSCP-WCAP-SESSION-ID>";
                        idString =
selectedLine.substring(tag.length( )); // get
substring after < >
                        idString = idString.substring(0,
idString.indexOf('<'));
                  }
                  catch( Exception e ) {
                        e.printStackTrace( );
                  }
                  return idString.trim( );
      }
      private String getFormatedTime(int year, int
month, int day, int hour, int minute, int second) {
            StringBufter dateTime = new
StringBuffer(" "+year);
                  if (month< 10) {
                        dateTime.append("0");
                  }
                  dateTime.append(month);
                  if (day<10) {
                        dateTime.append("0");
                  }
                  dateTime.append(day).append("T");
            if ( hour< 10) {
                        dateTime.append("0");//
                  }
                  dateTime.append(hour);
            if ( minute<10) {
                        dateTime.append("0"); //
                  }
                  dateTime.append(minute);
            if ( second<10) {
                        dateTime.append("0") ;//
```

-continued

```
                        dateTime.append(second);
                  log("The time is =:"+dateTime.toString( ));
                  return dateTime.toString( );
      }
            /**
            * login (String, String, String, String) in the calendar with
            * @param String url of Calendar server
            * @param String port of the Calendar server
            * @param String username
            * @param String password
            * @return boolean true login succeed, false means you
are not lucky.
            */
            private boolean login(String url, String
port, String user, String password) {
                        this.url = url;
                        this.port = port;
                        String strLogin = loginString(url,
port, user, password);
                        log(strLogin);
                  // login
                  try{
                              urlConnection(strLogin, "Login");
                              log("User session ID = " + userSessionId);
                              return logingSucceed;
                  }catch(Exception ex) {
                              ex.printStackTrace( );
                              return false;
                  }finally{
                              // what should be put here.?
                        }
                  }
            }
            /**
            * Convert Calendar Date in Start and End
elements into speakable date
                        * @param String dateStr ---
20000909T17000000 to Sept. 9, 2000
                  */
                  private String ToHumanDate(String theDate)
                  {
                              StringBuffer dateBuf = new StringBuffer( );
                              Integer year, month, day; year = new Integer
(theDate.substring(0, 4));
                              month = new Integer(theDate.substring(4, 6));
                              day = new Integer(theDate.substring(6, 8));
                              log("ToHumanDate dateStr: " + theDate);
dateBuf.append(monthStr[month.intValue( ) - 1]);
                              dateBuf.append(" ").append(day).append(", ").
append(year);
                              log("Converted Date: " +
dateBuf.toString( ));
                              return dateBuf.toString( );
                  }
            /**
            * Convert the time in the START element into
speakable time
                  * Such as 20000911T150000Z to 8 AM On Spet. 11, 2000
                  *
                  */
                  private String ToHumanTime(String theDate)
                  {
log("To
HumanTime&&&&&&&&&&&&&&&&&&&&&&&&&&&&&&&");
                              log("theDate =" + theDate) ;
                              Calendar localTime =
Calendar.getInstance(TimeZone.getDefault( ));
                              int GMToffset =
localTime.get(Calendar.ZONE_OFFSET) / 3600000;
                              System.out.print("GMT offset = ");
                              Integer year1, month1, day1, hour1, minute1,
second1;
                              int year, month, day, hour, minute, second;
                              year1 = new Integer(theDate.substring(0, 4));
                              month1 = new Integer(theDate.substring(4, 6));
                              day1 = new Integer(theDate.substring(6, 8));
                              hour1 = new Integer(theDate.substring(9, 11));
                              minute1 = new Integer(theDate.substring(11, 13));
                              second1 = new Integer(theDate.substring(13, 15));
                              year = year1.intValue( );
```

-continued

```
            month = month1.intValue( );
            day = day1.intValue( );
            hour = hour1.intValue( ) - 12 - GMToffset;
            minute = minute1.intValue( );
            second = second1.intValue( );
            if (hour < 0)
            {
                hour += 24;
                day --;
                if (day < 0)
                {
                    month --;
                    if (month < 0)
                        year --;
                }
            }
            else if (hour > 24)
                hour -= 12;
            String timeTag = "AM";
            Integer dayInt = new Integer(day);
            String dayStr = dayInt.toString( );
            Integer yearInt = new Integer(year);
            String yearStr = yearInt.toString( );
            if (hour > 12)
            {
                timeTag = "PM";
                hour -= 12;
            }
            else if (hour == 12)
                timeTag = " ";
            StringBuffer timeStr = new StringBuffer( );
                timeStr.append(toString(hour));
                if (minute > 0)
timeStr.append(":").append(toString(minute));
                if (second > 0)
timeStr.append(":").append(toString(second));
                timeStr.append(" ").append(timeTag);
                localTime.set(Calendar.YEAR, year);
                localTime.set(Calendar.MONTH, month - 1);
                localTime.set(Calendar.DAY_OF_MONTH,
day);
                Date date = localTime.getTime( );
                SimpleDateFormat fd = new
SimpleDateFormat("EEEE, MMMMMMMMM d, yyyy");
                curDate = fd.format(date);
//              log("converted time: " +
timeStr.toString( ) + " " + curDate);
                return timeStr.toString( );
        }
        private String toString (int value)
        {
                Integer tmpvalue = new Integer(value);
                return new
String(tmpvalue.toString( ));
        }
        /**
          logout( ) of the Calendar
        */
        public void logout( ) {
                String strLogout = logoutString( );
                log(strLogout);
                urlConnection(strLogout, "Logout");
                //return logoutSucceed;
        private void log(String s)
        {
                Log.log(Log.DEBUGGING, getClass( ), s);
        }
}
```

Figure 3:
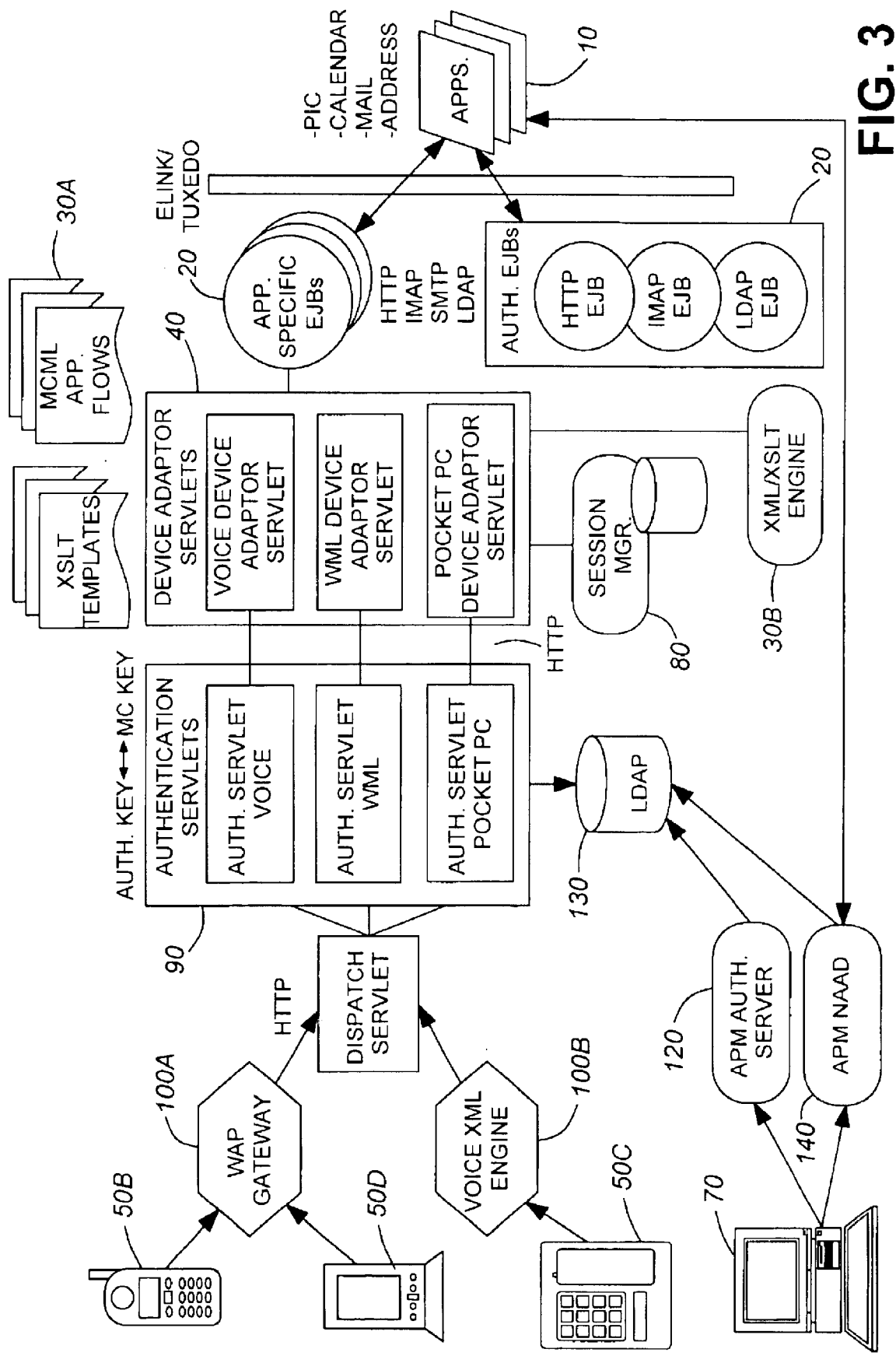
FIG. 3 is a detailed block diagram of the system whose implementation is described below.

FIG. 3 illustrates a full-blown system according to the invention including a session manager 80 and an authentication manager 90. The figure illustrates the different components of the full system as described above. It can be seen that the authentication manager 90 is shown as having multiple servlets within it. This is because each device type has a separate authentication servlet to accommodate the needs of that specific device type. Similarly, the DMI component 40 has multiple servlets within it—one servlet for each device type. The broker module 30 is shown as two components—the software MCML script 30A and the finite state machine XML/XSLT engine 30B which executes the script 30A. The AMI component 20 is depicted as two components—as application EJBs and authentication EJBs. Each group of EJBs has its specific function. The application EJBs provide the data to the broker module while the authentication EJBs provide the authentication data required by the authentication manager. The authentication EJBs also access the applications but only to the extent required by the authentication manager.

Also, as can be seen in FIG. 3, the end user devices communicate with an extra layer between itself and the authentication manager. For WAP enabled devices, a WAP gateway 100A receives their data. For a PSTN telephone 50C, the user's voice first goes through a Voice XML engine 100B which converts the user's voice input into data recognizable by the other components. A dispatch servlet 110 sends the signals to their proper servlet in the authentication manager.

For a regular PC 70, its authentication data has to travel through the APM (access policy manager) authorization server 120 and then to the LDAP (lightweight directory access protocol) server 130.

To step through the process, the PSTN telephone, if its user desires access to an application, the sequence of steps are as follows:

1. User dials up Voice Portal DN using a POTS phone
2. Voice Portal static welcome page is invoked, and the server makes a request to the authentication servlet via the initial URL.
3. Authentication servlet does not see a session key embedded in the request URL and therefore issues a challenge page appropriate to the device. It does this by checking the user agent type and other information in the request header, and by then fetching an MCML document that it translates through the appropriate XSL style sheet—which produces a Voice XML form, welcoming the user and asking for authentication (user id and password). The links in this Voice XML document have a temporary authentication key embedded in them by the authentication servlet, to protect this initial transaction.
4. Voice Portal begins to interpret the Voice XML script, which asks for the initial welcome prompt and login request. User listens to welcome prompt and to the request for user id, and keys in or speaks the requested info (we can set this choice either way through Voice XML tags).
5. Voice Portal then interprets the user input and sends a request to the Authentication servlet with the posted form data. The authentication servlet checks with APM and authenticates the user. If successful, it generates a session ID that will be appended to all subsequent transaction URLs with our server for this session.
6. The authentication servlet continues to interpret the PIC MCML flow, which asks it to call the PIC EJB, to get a list of enabled applications from the Personalization Server.
7. The EJB returns the list, filtered by the EJB adaptor into MCML, which is embedded into the PIC MCML template.
8. The list has associated hyperlink URLs that are filtered through the session manager, to append a session ID (URL rewriting).
9. The MCML is translated to Voice XML by the XSLT processor using the VoiceXML style sheet. It is then served to the Voice Portal for interpretation.

10. The user hears the list (TTS) and selects an application. This causes the Voice Portal to send an HTTP request to the authentication servlet.
11. The servlet now sees a session ID appended to the URL, and checks its validity. If valid, it passes the request on to the device adaptor servlet (DA), unchallenged.
12. The DA then retrieves the MCML page for that particular app. (this was encoded in the request URL).
13. It scans for dynamic placeholder tags, and makes calls to the application specific adaptor EJB's (method names and parameters are embedded in MCML) to generate dynamic application content if required.
14. The device adaptor EJB attempts to retrieve a client connection to the app. from the Session Manager.
15. The session manager cannot find the client, and throws an exception, which is passed on the DA.
16. The DA identifies this exception and invokes the authentication EJB associated with this app. which connects using the stored credentials, and then saves a client connection in the Session manager (Single sign-on).
17. The device adaptor then re-tries the initial call to the application adaptor, which will now successfully retrieve the client connection from the session manager.
18. The EJB connects to the app to get component.
19. This content is returned by the EJB's as MCML, through the EJB-DA interface object, which converts the data to MCML. The DA merges this MCML with the static MCML page template.
20. The DA then filters all URLs through the Session manager to append session ID. The link to the next MCML page is also generated and appended to the URLs here.
21. The DA then translates the MCML though XSLT to get a Voice XML, which is served back to the client.
22. Voice Portal client interprets the returned page, and cycles through the process starting at step 11 above (without the initial authentication exceptions), invoking further MCML pages.
23. The cycle continues until the MCML FSM script reaches an exit state, at which point the DA closes the connection by deleting the session—by making a call to the Session manager. Further requests will then require the authentication cycle to kick-in. User inactivity time-outs can also occur if the user hangs up, or fails to respond within a prescribed delay.

For a WAP enabled cellular telephone or a WAP enabled PDA, the process is as follows:
1. User accesses WAP gateway via Remote Access Server dialup programmed into the WAP handset. User selects a link to access the multi-channel system.
2. As a result, WAP gateway makes a request to the authentication servlet.
3. Authentication servlet does not see a session ID embedded in the request URL and therefore issues a challenge page appropriate to the device. It does this by checking the user agent type in the header, and by then fetching an MCML document that it translates through the appropriate XSL style sheet—which produces a HDML or WML deck, welcoming the user and asking for authentication (user id and password). The links in this document have a temporary authentication key embedded in them by the authentication servlet, to protect this initial transaction. Care must be taken not to exceed the limitations on URL size inherent to some WML and HDML browsers.
4. The handset browser displays the card deck, which asks for the initial welcome prompt and login request. User keys in credentials. These are sent through WAP gateway as a request to the authentication servlet with the posted form data. The authentication servlet checks with APM and authenticates the user. If successful, it generates a session ID that will be appended to all subsequent transaction URLs with our server for this session.
5. The authentication servlet continues to interpret the PIC MCML flow, which asks it to call the PIC EJB, to get a list of enabled applications from the Personalization Server.
6. The EJB returns a list of application, filtered by the EJB adaptor to produce MCML, which is embedded into the PIC MCML template.
7. The list has associated hyperlink URLs that are filtered through the session manager, to append a session ID (URL rewriting).
8. The MCML is translated to WML or HDML by the XSLT processor using the appropriate style sheet. It is then served to the WAP gateway for forwarding to the handset.
9. The user sees the list and selects an application. This causes the WAP gateway to send a HTTP request to the authentication servlet.
10. The servlet now sees a session ID appended to the URL, and checks its validity. If valid, it passes the request on to the device adaptor servlet (DA), unchallenged.
11. The DA then retrieves the MCML page for that particular app. (this was encoded in the request URL).
12. It scans for dynamic placeholder tags, and makes calls to the application specific adaptor EJB's (method names and parameters are embedded in MCML) to generate dynamic application content if required.
13. The device adaptor EJB attempts to retrieve a client connection to the app. from the Session Manager.
14. The session manager cannot find the client, and throws an exception, which is passed on the DA.
15. The DA identifies this exception and invokes the authentication EJB associated with this app. which connects using the stored credentials, and then saves a client connection in the Session manager (Single sign-on).
16. The device adaptor then re-tries the initial call to the application adaptor, which will now successfully retrieve the client connection from the session manager.
17. The EJB connects to the app to get content.
18. This content is returned by the EJB's as MCML, through the EJB-DA interface object, which converts the data to MCML. The DA merges this MCML with the static MCML page template.
19. The DA then filters all URLs through the Session manager to append session ID. The link to the next MCML page is also generated and appended to the URLs here.
20. The DA then translates the MCML though XSLT to get WML a HDML deck, which is served back to the client.
21. WAP gateway forwards the returned deck to handset, and cycles through the process starting at step 10 (but omitting any initial authentication exceptions) above, invoking further MCML pages.
22. The cycle continues until the MCML FSM script reaches an exit state, at which point the DA closes the connection by deleting the session—by making a call to the Session manager. Further request will then require the authentication cycle to kick-in. User inactivity time-outs can also occur if the user disconnects, or fails to respond within a prescribed delay.

A person understanding the above-described invention may now conceive of alternative designs, using the principles described herein. All such designs which fall within the scope of the claims appended hereto are considered to be part of the present invention.

We claim:

1. A system for enabling multiple types of end user devices to access multiple Internet-based applications through the internet, said system comprising:
    an Application Mediation Interface (AMI) component for communicating with said Internet-based applications through the internet;
    a Device Mediation Interface (DMI) component for communicating with said end user devices; and
    a broker module for communicating with said DMI component and with said AMI component,
    wherein,
    said DMI component converts end data received from said broker module into a format suitable for an end user device;
    said DMI component transmits replies to prompts from said broker module based on an end user's input into said end user device;
    said broker module emulates a sequence of events and decisions followed by an Internet-based application;
    said broker module requests application data from said AMI component based on said broker module emulating said Internet-based application;
    said AMI component receives requests from said broker module and transmits replies to said requests to said broker module based on original data from said application,
    said broker module transmits end data to said DMI component, said end data being based on at least one factor chosen from the group comprising:
        said broker module's emulation of said Internet-based application; and
        application data received from said AMI component.

2. A system as in claim 1 further including a session manager for managing a session between an end user device and said an Internet-based application, said session manager storing variables and data received from said application by said AMI component.

3. A system as in claim 2 wherein said session manager is internal to said AMI component.

4. A system as in claim 1 further including an authentication manager for determining whether an end user device requesting access to an Internet-based application is entitled to said access.

5. A system as in claim 1 wherein said DMI component is connectable to said multiple types of end user devices, said DMI component for communicating with each of said end user devices which each require different data formats.

6. A system as in claim 1 wherein said broker module includes multiple brokers separate from one another.

7. A system as in claim 6 wherein one of said multiple brokers corresponds to one of said multiple Internet-based applications, one of said multiple brokers being for:
    requesting application data to said AMI component;
    emulating a sequence of events and decisions followed by one of said Internet-based applications; and
    transmitting end data to said DMI component.

8. A method of enabling multiple types of end user devices to access multiple Internet-based applications through the internet, said method comprising the steps of:
    emulating a sequence of events and decisions followed by an Internet-based application at a broker module;
    requesting application data from an Application Mediation Interface (AMI) component based on an emulation of said Internet-based application by said broker module, said AMI component communicating with said Internet-based application;
    transmitting application data requested to said broker module from said Internet-based application, said application data being based on original data received from said Internet-based application by said AMI component;
    transmitting end data to a Device Mediation Interface (DMI) component, said end data being based on at least one factor chosen from the group comprising:
        said broker module's emulation of said Internet-based application; and
        application data received from said AMI component; and
    converting said end data at said DMI component into a format suitable for an end user device communicating with said DMI component.

9. A method as in claim 8, further including the step of:
    authenticating an end user device to determine whether an end user is allowed to access said Internet-based application, said step of authenticating being accomplished by an authentication manager.

10. A method as in claim 8, further including the step of:
    managing a session between an end user device and an Internet-based application by storing variables and data received from said Internet-based application by said AMI component, said step of managing being accomplished by a session manager.

11. A method as in claim 8, wherein said broker module includes multiple brokers separate from one another, said steps of emulating a sequence of events and decisions, requesting application data, transmitting application data requested and transmitting end data to said DMI component are accomplished by one of said multiple brokers.

12. A method for the integration of end user devices for accessing Internet-based applications, said method comprising the steps of:
    providing multiple Internet-based applications;
    providing multiple types of end user devices for accessing the multiple Internet-based applications through the internet;
    emulating a sequence of events and decisions followed by an Internet-based application at a broker module;
    requesting application data from an Application Mediation Interface (AMI) component based on an emulation of said Internet-based application by said broker module, said AMI component communicating with said Internet-based application;
    transmitting application data requested to said broker module from said Internet-based application, said application data being based on original data received from said Internet-based application by said AMI component;
    transmitting end data to a Device Mediation Interface (DMI) component, said end data being based on at least one factor chosen from the group comprising:
        said broker module's emulation of said Internet-based application, and
        application data received from said AMI component; and converting said end data at said DMI component into a format suitable for an end user device communicating with said DMI component.

13. A method as in claim 12 wherein said multiple types of end user devices are chosen from the group comprising:
- a Wireless Application Protocol (WAP) enabled mobile device;
- a personal digital assistant (PDA) device;
- a palmtop device; and
- a public switched telephone network (PSTN) device.

14. A method as in claim 12 further including the step of:
authenticating an end user device to determine whether a corresponding end user is allowed to access said Internet-based application, said step of authenticating being accomplished by an authentication manager.

15. A method as in claim 12, further including the step of:
managing a session between an end user device and an Internet-based application by storing variables and data received from said Internet-based application by said AMI component, said step of managing is accomplished by a session manager.

16. A method as in claim 12, wherein said broker module includes multiple brokers separate from one another, said steps of emulating a sequence of events and decisions, requesting application data, transmitting application data requested and transmitting end data to said DMI component are accomplished by one of said multiple brokers.

* * * * *